US010941253B2

(12) United States Patent
Hayakawa et al.

(10) Patent No.: US 10,941,253 B2

(45) Date of Patent: Mar. 9, 2021

(54) BLOCK COPOLYMER, AND METHOD OF PRODUCING STRUCTURE CONTAINING PHASE-SEPARATED STRUCTURE

(71) Applicants: TOKYO OHKA KOGYO CO., LTD., Kawasaki (JP); TOKYO INSTITUTE OF TECHNOLOGY, Tokyo (JP)

(72) Inventors: Teruaki Hayakawa, Tokyo (JP); Seina Yamazaki, Tokyo (JP); Rin Odashima, Tokyo (JP); Takehiro Seshimo, Kawasaki (JP); Daisuke Kawana, Kawasaki (JP); Akiyoshi Yamazaki, Kawasaki (JP)

(73) Assignees: Tokyo Ohka Kogyo Co., Ltd., Kawasaki (JP); Tokyo Institute of Technology, Tokyo (JP)

( * ) Notice: Subject to any disclaimer, the term of this patent is extended or adjusted under 35 U.S.C. 154(b) by 122 days.

(21) Appl. No.: 15/895,588

(22) Filed: Feb. 13, 2018

(65) Prior Publication Data

US 2018/0244856 A1 Aug. 30, 2018

(30) Foreign Application Priority Data

Feb. 27, 2017 (JP) ............................. JP2017-035254

(51) Int. Cl.

| | |
|---|---|
| ***C08G 77/20*** | (2006.01) |
| ***C08G 81/02*** | (2006.01) |
| ***C08L 83/08*** | (2006.01) |
| ***C08F 299/08*** | (2006.01) |
| ***C08F 297/02*** | (2006.01) |
| ***C08G 77/442*** | (2006.01) |
| ***C08L 83/10*** | (2006.01) |
| *C08F 220/18* | (2006.01) |
| *C08F 212/08* | (2006.01) |
| *B05D 3/10* | (2006.01) |
| *C09D 7/20* | (2018.01) |
| *B32B 27/28* | (2006.01) |

(52) U.S. Cl.

CPC .......... *C08G 81/024* (2013.01); *C08F 297/02* (2013.01); *C08F 299/08* (2013.01); *C08G 77/20* (2013.01); *C08G 77/442* (2013.01); *C08L 83/08* (2013.01); *C08L 83/10* (2013.01); *B05D 3/107* (2013.01); *B32B 27/283* (2013.01); *C08F 212/08* (2013.01); *C08F 220/18* (2013.01); *C09D 7/20* (2018.01)

(58) Field of Classification Search

CPC .............................. C08G 77/42; C08G 77/442

See application file for complete search history.

(56) References Cited

U.S. PATENT DOCUMENTS

| | | | | |
|---|---|---|---|---|
| 6,306,992 B1 * | 10/2001 | Yoshitake | C07F 7/0838 526/279 |
| 6,384,172 B1 * | 5/2002 | Dvornic | C08G 77/12 528/15 |
| 7,446,155 B2 * | 11/2008 | Dvornic | C08G 83/005 525/474 |
| 2011/0054137 A1 * | 3/2011 | Hu | C08G 77/24 528/25 |
| 2016/0257789 A1 | 9/2016 | Seshimo et al. | |

FOREIGN PATENT DOCUMENTS

| | | |
|---|---|---|
| JP | 2008-036491 A | 2/2008 |
| JP | 2016-166323 A | 9/2016 |

OTHER PUBLICATIONS

William Hinsberg et al., Proceedings of SPIE (U.S.), vol. 7637, pp. 76370G-1 to 76370G-11 (2010).

Miftakhul Huda et al., Jpn. J. Appl. Phys. 50 (2011) 06GG06-1 to 06GG06-5.

Kevin W. Gotrik et al., ACS Nano 6 (2012) 8052.

* cited by examiner

*Primary Examiner* — Margaret G Moore

(74) *Attorney, Agent, or Firm* — Knobbe Martens Olson & Bear, LLP

(57) ABSTRACT

A block copolymer including a first block and a second block, the first block consisting of a polymer (P1) having a repeating structure of a structural unit (u1) containing in a side chain thereof a hyperbranched structure containing a silicon atom.

12 Claims, 1 Drawing Sheet

BLOCK COPOLYMER, AND METHOD OF PRODUCING STRUCTURE CONTAINING PHASE-SEPARATED STRUCTURE

TECHNICAL FIELD

The present invention relates to a block copolymer, and a method of producing structure containing phase-separated structure.

This application claims priority to Japanese Patent Application No. 2017-035254, filed Feb. 27, 2017, the entire content of which is incorporated herein by reference.

DESCRIPTION OF RELATED ART

Recently, as further miniaturization of large scale integrated circuits (LSI) proceeds, a technology for processing a more delicate structure is demanded. In response to such demand, attempts have been started on forming a fine pattern using a phase-separated structure formed by self-assembly of block polymers having mutually incompatible blocks bonded together. (For example, Patent Literature 1).

For using a phase-separation structure of a block copolymer, it is necessary to form a self-organized nano structure by a microphase separation only in specific regions, and arrange the nano structure in a desired direction. For realizing position control and orientational control, processes such as graphoepitaxy to control phase-separated pattern by a guide pattern and chemical epitaxy to control phase-separated pattern by difference in the chemical state of the substrate are proposed (see, for example, Non-Patent Document 1).

A block copolymer forms a regular periodic structure by phase separation. The periodic structure changes to a cylinder, a lamellar or a sphere, depending on the volume ratio or the like of the polymer components. Further, it is known that the period depends on the molecular weight.

Attempts have been made to form fine patterns having a perpendicular cylinder shape in which cylinders are oriented in a perpendicular direction, a horizontal cylinder shape in which cylinders are oriented in a horizontal direction, and a perpendicular lamellar shape in which lamellars are oriented in a perpendicular direction. For example, in Non-Patent Literature 2, attempt is made to form a horizontal cylinder shape using a block copolymer constituted of polystyrene and polydimethylsiloxane. Further, in Non-Patent Literature 3, attempt has been made to form a perpendicular cylinder shape by solvent annealing using a block copolymer constituted of polystyrene and polydimethylsiloxane. Further, in Patent Literature 2, attempt has been made to improve the perpendicularity of a pattern by introducing a polar group at the terminal of a side chain of a block copolymer including polystyrene and a siloxane derivative.

DOCUMENTS OF RELATED ART

Patent Literature

[Patent Document 1] Japanese Unexamined Patent Application, First Publication No. 2008-36491

[Patent Literature 2] Japanese Unexamined Patent Application, First Publication No. 2016-166323

Non-Patent Documents

[Non-Patent Document 1] Proceedings of SPIE (U.S.), vol. 7637, pp. 76370G-1 (2010)

[Non-Patent Document 2] Jpn. J. Appl. Phys. 50 (2011) 06GG06.

[Non-Patent Document 3] ACS Nano 6 (2012) 8052.

SUMMARY OF THE INVENTION

However, in the method disclosed in Non-Patent Literature 2, since the surface free energy of polydimethylsiloxane is lower than that of polystyrene, polydimethylsiloxane is likely to be segregated on the surface layer after heat annealing. Therefore, in order to form a pattern, it becomes necessary to separately conduct an etching step, and it was difficult to form a perpendicular cylinder structure suitable for microprocessing.

Further, as described in Non-Patent Literature 3, in a process which requires solvent annealing, a large-scale apparatus becomes necessary. Therefore, there was a problem that industrial development was difficult.

The present invention takes the above circumstances into consideration, with an object of providing a block copolymer preferable for self-directed assembly, and a method of producing a structure containing a phase-separated structure.

A first aspect of the present invention is a block copolymer including a first block and a second block, the first block consisting of a polymer (P1) having a repeating structure of a structural unit (u1) containing in a side chain thereof a hyperbranched structure containing a silicon atom.

A second aspect of the present invention is a method of producing a structure containing a phase-separated structure, the method including a step (i) in which a layer containing the block copolymer according to the first aspect is formed on a substrate, and a step (ii) in which the layer containing the block copolymer is phase-separated.

In the present description and claims, the term "aliphatic" is a relative concept used in relation to the term "aromatic", and defines a group or compound that has no aromaticity.

The term "alkyl group" includes linear, branched or cyclic, monovalent saturated hydrocarbon, unless otherwise specified.

The term "alkylene group" includes linear, branched or cyclic, divalent saturated hydrocarbon, unless otherwise specified. The same applies for the alkyl group within an alkoxy group.

A "halogenated alkyl group" is a group in which part or all of the hydrogen atoms of an alkyl group is substituted with a halogen atom. Examples of the halogen atom include a fluorine atom, a chlorine atom, a bromine atom and an iodine atom.

A "fluorinated alkyl group" or a "fluorinated alkylene group" is a group in which part or all of the hydrogen atoms of an alkyl group or an alkylene group have been substituted with a fluorine atom.

The term "structural unit" refers to a monomer unit that contributes to the formation of a polymeric compound (resin, polymer, copolymer).

A "structural unit derived from an acrylate ester" refers to a structural unit that is formed by the cleavage of the ethylenic double bond of an acrylate ester.

An "acrylate ester" refers to a compound in which the terminal hydrogen atom of the carboxy group of acrylic acid ($CH_2$═CH—COOH) has been substituted with an organic group.

The acrylate ester may have the hydrogen atom bonded to the carbon atom on the α-position substituted with a substituent. The substituent that substitutes the hydrogen atom bonded to the carbon atom on the α-position is atom other than hydrogen or a group, and examples thereof include an alkyl group of 1 to 5 carbon atoms, a halogenated alkyl group of 1 to 5 carbon atoms and a hydroxyalkyl group. A carbon atom on the α-position of an acrylate ester refers to the carbon atom bonded to the carbonyl group, unless specified otherwise.

Hereafter, an acrylate ester having the hydrogen atom bonded to the carbon atom on the α-position substituted with a substituent is sometimes referred to as "α-substituted acrylate ester". Further, acrylate esters and a-substituted acrylate esters are collectively referred to as "(α-substituted) acrylate ester".

A "structural unit derived from a hydroxystyrene derivative" refers to a structural unit that is formed by the cleavage of the ethylenic double bond of a hydroxystyrene derivative.

The term "hydroxystyrene derivative" includes compounds in which the hydrogen atom at the α-position of hydroxystyrene has been substituted with another substituent such as an alkyl group or a halogenated alkyl group; and derivatives thereof. Examples of the derivatives thereof include hydroxystyrene in which the hydrogen atom of the hydroxy group has been substituted with an organic group and may have the hydrogen atom on the α-position substituted with a substituent; and hydroxystyrene which has a substituent other than a hydroxy group bonded to the benzene ring and may have the hydrogen atom on the α-position substituted with a substituent. Here, the α-position (carbon atom on the α-position) refers to the carbon atom having the benzene ring bonded thereto, unless specified otherwise.

As the substituent which substitutes the hydrogen atom on the α-position of hydroxystyrene, the same substituents as those described above for the substituent on the α-position of the aforementioned a-substituted acrylate ester can be mentioned.

A "structural unit derived from vinylbenzoic acid or a vinylbenzoic acid derivative" refers to a structural unit that is formed by the cleavage of the ethylenic double bond of vinylbenzoic acid or a vinylbenzoic acid derivative.

The term "vinylbenzoic acid derivative" includes compounds in which the hydrogen atom at the α-position of vinylbenzoic acid has been substituted with another substituent such as an alkyl group or a halogenated alkyl group; and derivatives thereof. Examples of the derivatives thereof include benzoic acid in which the hydrogen atom of the carboxy group has been substituted with an organic group and may have the hydrogen atom on the α-position substituted with a substituent; and benzoic acid which has a substituent other than a hydroxy group and a carboxy group bonded to the benzene ring and may have the hydrogen atom on the α-position substituted with a substituent. Here, the α-position (carbon atom on the α-position) refers to the carbon atom having the benzene ring bonded thereto, unless specified otherwise.

A "styrene derivative" refers to a compound in which the hydrogen atom on the α-position of styrene is substituted with a substituent such as an alkyl group, a halogenated alkyl group or the like.

A "structural unit derived from styrene" or "structural unit derived from a styrene derivative" refers to a structural unit that is formed by the cleavage of the ethylenic double bond of styrene or a styrene derivative.

As the alkyl group as a substituent on the α-position, a linear or branched alkyl group is preferable, and specific examples include a methyl group, an ethyl group, a propyl group, an isopropyl group, an n-butyl group, an isobutyl group, a tert-butyl group, a pentyl group, an isopentyl group and a neopentyl group.

Specific examples of the halogenated alkyl group as the substituent on the a-position include groups in which part or all of the hydrogen atoms of the aforementioned "alkyl group as the substituent on the α-position" are substituted with halogen atoms. Examples of the halogen atom include a fluorine atom, a chlorine atom, a bromine atom and an iodine atom, and a fluorine atom is particularly desirable.

Specific examples of the hydroxyalkyl group as the substituent on the α-position include groups in which part or all of the hydrogen atoms of the aforementioned "alkyl group as the substituent on the α-position" are substituted with a hydroxy group. The number of hydroxy groups within the hydroxyalkyl group is preferably 1 to 5, and most preferably 1.

The term "exposure" is used as a general concept that includes irradiation with any form of radiation.

According to the present invention, there are provided a block copolymer preferable for self-directed assembly, and a method of producing a structure containing a phase-separated structure.

DETAILED DESCRIPTION OF THE INVENTION

<<Block Copolymer>>

Figure 1:
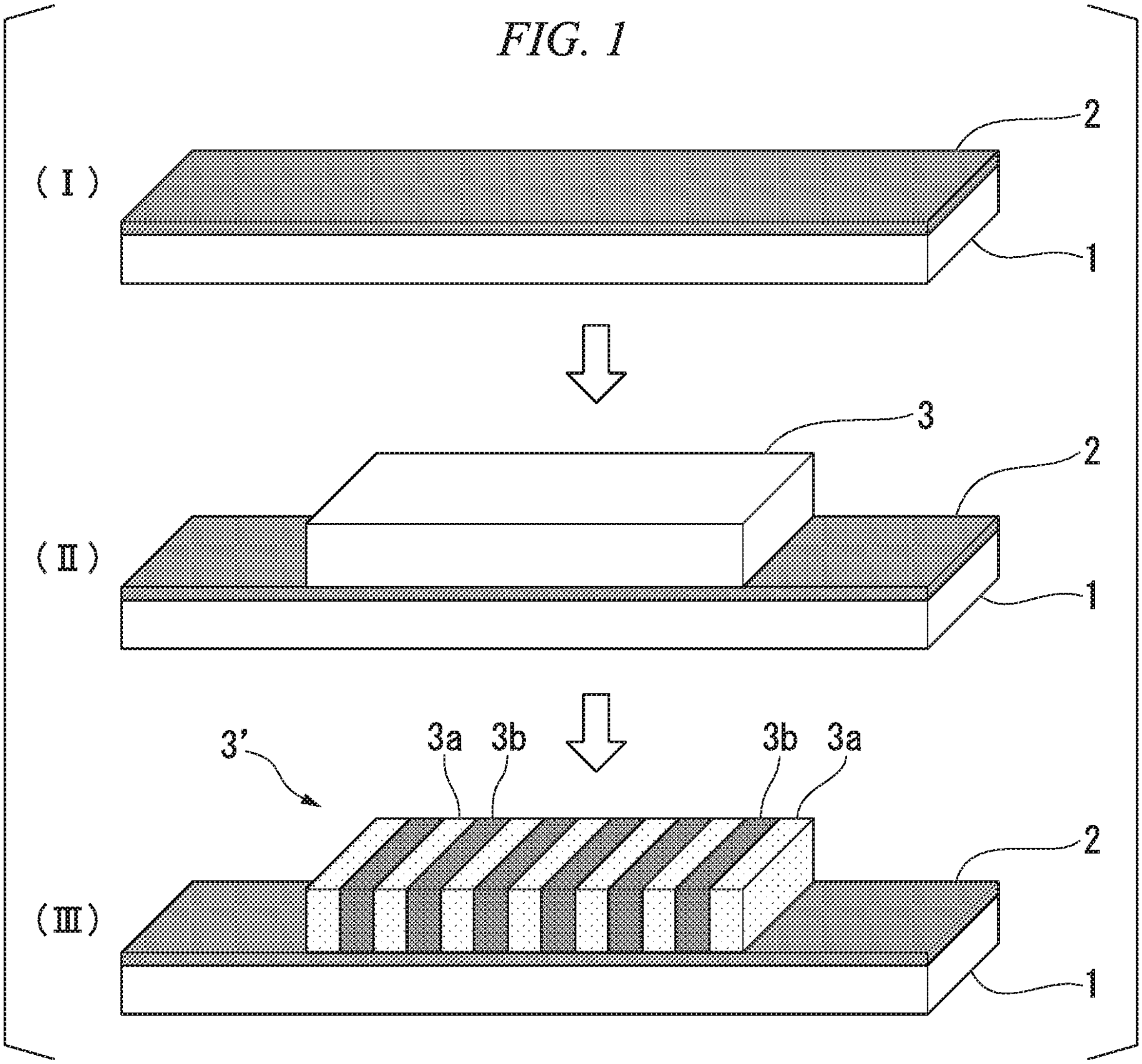
FIG. 1 is a schematic diagram showing an example of one embodiment of the method of forming a structure containing a phase-separated structure according to the present invention.

The block copolymer according to the present embodiment includes a first block and a second block, the first block consisting of a polymer (P1) having a repeating structure of a structural unit (u1) containing in a side chain thereof a hyperbranched structure containing a silicon atom (hereafter, referred to as "structural unit (u1)").

In the present embodiment, a "block copolymer" refers to a polymeric material in which plurality of blocks (partial constitutional components in which the same kind of structural unit is repeatedly bonded) are bonded. As the blocks constituting the block copolymer, 2 kinds of blocks may be used, or 3 or more kinds of blocks may be used.

Further, in the present embodiment, a "hyperbranched structure" refers to a branched structure in which molecular chains are three-dimensionally spread by polymerization of multifunctional monomers having 2 or more kinds of functional groups, for example, as described in Macromolecules 39 8892 (2006).

<First Block>

The first block consists of a polymer (P1) having a repeating structure of a structural unit (u1) containing in a side chain thereof a hyperbranched structure containing a silicon atom.

In the present embodiment, the hyperbranched structure containing a silicon atom preferably has a polar group on the terminal thereof. Examples of the polar group include —OH, —C(=O)OH, —O—, —C(=O)—, —C(=O)—O—, —SH, $—SO_3H$, —S—, —C(=S)—, —S(=O)—, $—S(=O)_2—$, $—S(=O)_2—O—$, $—NH_2$, —N=, —NH— and —C(=O)NH—.

Among these examples, as the polar group, —OH is preferable.

The structural unit (u1) is preferably a structural unit derived from siloxane or a derivative thereof, and more preferably a structural unit represented by general formula (u1-1) shown below.

[Chemical Formula 1]

(u1-1)

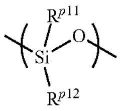

In the formula, $R^{P11}$ represents an organic group having a hyperbranched structure containing a silicon atom; $R^{P12}$ represents an alkyl group, a halogenated alkyl group, a hydrogen atom or an organic group having a hyperbranched structure containing a silicon atom.

In general formula (u1-1), $R^{P11}$ represents an organic group having a hyperbranched structure containing a silicon atom. Examples of the hyperbranched structure containing a silicon atom include a hyperbranched structure containing a siloxane bond. Specific examples include an organic group having a hyperbranched structure containing a partial structure represented by general formula (P101) described later; and an organic group having a hyperbranched structure containing a partial structure represented by general formula (P101) described later and a partial structure represented by general formula (P102) described later.

The organic group for $R^{P11}$ is not particularly limited, and examples thereof include a monovalent hydrocarbon group which may have a substituent. The hydrocarbon group may be either an aliphatic hydrocarbon group or an aromatic hydrocarbon group.

Aliphatic Hydrocarbon Group for $R^{P11}$

The "aliphatic hydrocarbon group" refers to a hydrocarbon group that has no aromaticity. The aliphatic hydrocarbon group may be saturated or unsaturated. In general, the aliphatic hydrocarbon group is preferably saturated.

Examples of the aliphatic hydrocarbon group include a linear or branched aliphatic hydrocarbon group, and an aliphatic hydrocarbon group containing a ring in the structure thereof can be given.

Linear or Branched Aliphatic Hydrocarbon Group

Examples of the linear or branched aliphatic hydrocarbon group include an alkyl group, an alkenyl group and an alkynyl group. Examples of the alkyl group include alkyl groups of 1 to 20 carbon atoms (preferably 1 to 10 carbon atoms, more preferably 1 to 6 carbon atoms) such as a methyl group, an ethyl group, a propyl group, an isopropyl group, a butyl group, an isobutyl group, a s-butyl group, a t-butyl group, a pentyl group, a hexyl group, a heptyl group, an octyl group, a 2-ethylhexyl group, a nonyl group and a decyl group. Examples of the alkenyl group include alkenyl groups of 2 to 20 carbon atoms (preferably 2 to 10 carbon atoms, and more preferably 2 to 6 carbon atoms), such as a vinyl group, an allyl group and a butenyl group. Examples of the alkynyl group include alkynyl groups of 2 to 20 carbon atoms (preferably 2 to 10 carbon atoms, and more preferably 2 to 6 carbon atoms), such as an ethynyl group and a propynyl group.

The linear or branched aliphatic hydrocarbon group may or may not have a substituent. Examples of the substituent include a fluorine atom, a fluorinated alkyl group of 1 to 5 carbon atoms, and a carbonyl group.

Aliphatic Hydrocarbon Group Containing a Ring in the Structure Thereof

As examples of the hydrocarbon group containing a ring in the structure thereof, an alicyclic hydrocarbon group, a group in which the alicyclic hydrocarbon group is bonded to the terminal of the aforementioned chain-like aliphatic hydrocarbon group, and a group in which the alicyclic group is interposed within the aforementioned linear or branched aliphatic hydrocarbon group, can be given.

Examples of the alicyclic hydrocarbon group include a 3- to 8-membered ring cycloalkyl group, such as a cyclopropyl group, a cyclobutyl group, a cyclopentyl group, a cyclohexyl group, a cycloheptyl group or a cyclooctyl group; a 3- to 8-membered ring cycloalkenyl group, such as a cyclopentenyl group or a cyclohexenyl group; a bridged cyclic hydrocarbon group of 4 to 20 carbon atoms (preferably 7 to 12 carbon atoms), such as an adamantyl group or a norbornyl group.

The cyclic aliphatic hydrocarbon group may or may not have a substituent. Examples of the substituent include an alkyl group, an alkoxy group, a halogen atom, a halogenated alkyl group, a hydroxyl group and a carbonyl group.

The alkyl group as the substituent is preferably an alkyl group of 1 to 5 carbon atoms, and a methyl group, an ethyl group, a propyl group, an n-butyl group or a tert-butyl group is particularly desirable.

The alkoxy group as the substituent is preferably an alkoxy group having 1 to 5 carbon atoms, more preferably a methoxy group, ethoxy group, n-propoxy group, iso-propoxy group, n-butoxy group or tert-butoxy group, and most preferably a methoxy group or an ethoxy group.

Examples of the halogen atom for the substituent include a fluorine atom, a chlorine atom, a bromine atom and an iodine atom, and a fluorine atom is preferable.

Examples of the halogenated alkyl group for the substituent include groups in which part or all of the hydrogen atoms within the aforementioned alkyl groups has been substituted with the aforementioned halogen atoms.

The cyclic aliphatic hydrocarbon group may have part of the carbon atoms constituting the ring structure thereof substituted with a substituent containing a hetero atom. As the substituent containing a hetero atom, —O—, —(C═O)—O—, —S—, —(═O)$_2$— or —S(═O)$_2$—O— is preferable.

Aromatic Hydrocarbon Group for $R^{P11}$

The aromatic hydrocarbon group is a hydrocarbon group having at least one aromatic ring.

The aromatic ring is not particularly limited, as long as it is a cyclic conjugated compound having (4n+2) α electrons, and may be either monocyclic or polycyclic. The aromatic ring preferably has 5 to 30 carbon atoms, more preferably 5 to 20, still more preferably 6 to 15, and most preferably 6 to 12. Here, the number of carbon atoms within a substituent(s) is not included in the number of carbon atoms of the aromatic hydrocarbon group. Examples of the aromatic ring include aromatic hydrocarbon rings, such as benzene, naphthalene, anthracene and phenanthrene; and aromatic hetero rings in which part of the carbon atoms constituting the aforementioned aromatic hydrocarbon rings has been substituted with a hetero atom. Examples of the hetero atom within the aromatic hetero rings include an oxygen atom, a sulfur atom and a nitrogen atom.

Specific examples of the aromatic hetero ring include a pyridine ring and a thiophene ring.

Specific examples of the aromatic hydrocarbon group include a group in which one hydrogen atom has been removed from the aforementioned aromatic hydrocarbon ring or aromatic hetero ring (aryl group or heteroaryl group); a group in which one hydrogen atom has been removed from an aromatic compound having two or more aromatic rings (biphenyl, fluorene or the like); and a group in which one hydrogen atom of the aforementioned aromatic hydrocarbon ring or aromatic hetero ring has been substituted with an alkylene group (an arylalkyl group such as a benzyl group, a phenethyl group, a 1-naphthylmethyl group, a 2-naphthylmethyl group, a 1-naphthylethyl group, or a 2-naphthylethyl group). The alkylene group which is bonded to the aforementioned aryl group or heteroaryl group preferably has 1 to 4 carbon atoms, more preferably 1 or 2 carbon atoms, and most preferably 1 carbon atom.

With respect to the aromatic hydrocarbon group, the hydrogen atom within the aromatic hydrocarbon group may be substituted with a substituent. For example, the hydrogen atom bonded to the aromatic ring within the aromatic hydrocarbon group may be substituted with a substituent. Examples of substituents include an alkyl group, an alkoxy group, a halogen atom, a halogenated alkyl group, and a hydroxyl group.

The alkyl group as the substituent is preferably an alkyl group of 1 to 5 carbon atoms, and a methyl group, an ethyl group, a propyl group, an n-butyl group or a tert-butyl group is particularly desirable.

As the alkoxy group, the halogen atom and the halogenated alkyl group for the substituent, the same groups as the aforementioned substituent groups for substituting a hydrogen atom within the cyclic aliphatic hydrocarbon group can be used.

In general formula (u1-1), $R^{P12}$ represents an alkyl group, a halogenated alkyl group, a hydrogen atom or an organic group having a hyperbranched structure containing a silicon atom.

The organic group having a hyperbranched structure containing a silicon atom for $R^{P12}$ is the same as defined for the organic group having a hyperbranched structure containing a silicon atom for $R^{P11}$.

As the alkyl group for $R^{P12}$, a linear or branched alkyl group is preferable, and specific examples include alkyl groups of 1 to 5 carbon atoms, such as a methyl group, an ethyl group, a propyl group, an isopropyl group, an n-butyl group, an isobutyl group, a tert-butyl group, a pentyl group, an isopentyl group and a neopentyl group.

Examples of the halogenated alkyl group for $R^{P12}$ include groups in which part or all of the hydrogen atoms within the aforementioned alkyl groups has been substituted with a halogen atom. Examples of the halogen atom include a fluorine atom, a chlorine atom, a bromine atom and an iodine atom.

Among these examples, as $R^{P12}$, an alkyl group, a halogenated alkyl group or a hydrogen atom is preferable, an alkyl group of 1 to 5 carbon atoms, a halogenated alkyl group of 1 to 5 carbon atoms or a hydrogen atom is more preferable, and a methyl group or a hydrogen atom is most preferable.

As the structural unit (u1), a structural unit represented by general formula (u1-1-1) is most preferable.

[Chemical Formula 2]

(u1-1-1)

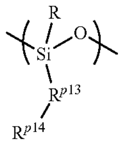

In the formula, R represents a hydrogen atom, an alkyl group of 1 to 5 carbon atoms or a halogenated alkyl group of 1 to 5 carbon atoms; $R^{P13}$ represents a divalent linking group; $R^{P14}$ represents an organic group having a hyperbranched structure containing a silicon atom, wherein at least a part of the terminal of the hyperbranched structure is a group containing a polar group.

In general formula (u1-1-1), R represents a hydrogen atom, an alkyl group of 1 to 5 carbon atoms or a halogenated alkyl group of 1 to 5 carbon atoms.

The alkyl group of 1 to 5 carbon atoms and the halogenated alkyl group of 1 to 5 carbon atoms for R are the same as defined for the alkyl group of 1 to 5 carbon atoms or a halogenated alkyl group of 1 to 5 carbon atoms for $R^{P12}$, respectively. Among these examples, as R, a methyl group or a hydrogen atom is preferable.

In general formula (u1-1-1), $R^{P13}$ represents a divalent linking group. The divalent linking group is not particularly limited, and preferable examples thereof include a divalent hydrocarbon group which may have a substituent and a divalent linking group containing a hetero atom.

Divalent Hydrocarbon Group Which May Have a Substituent:

In the case where $R^{P13}$ is a divalent linking group which may have a substiuent, the hydrocarbon group may be either an aliphatic hydrocarbon group or an aromatic hydrocarbon group.

Aliphatic Hydrocarbon Group for $R^{P13}$

The "aliphatic hydrocarbon group" refers to a hydrocarbon group that has no aromaticity. The aliphatic hydrocarbon group may be saturated or unsaturated. In general, the aliphatic hydrocarbon group is preferably saturated.

Examples of the aliphatic hydrocarbon group include a linear or branched aliphatic hydrocarbon group, and an aliphatic hydrocarbon group containing a ring in the structure thereof can be given.

Linear or Branched Aliphatic Hydrocarbon Group

The linear or branched aliphatic hydrocarbon group preferably has 1 to 10 carbon atoms, more preferably 1 to 6, still more preferably 1 to 4, and most preferably 1 to 3.

As the linear aliphatic hydrocarbon group, a linear alkylene group is preferable. Specific examples thereof include a methylene group [$-CH_2-$], an ethylene group [$-(CH_2)_2-$], a trimethylene group [$-(CH_2)3-$], a tetramethylene group [$-(CH_2)_4-$] and a pentamethylene group [$-(CH_2)_5-$].

As the branched aliphatic hydrocarbon group, branched alkylene groups are preferred, and specific examples include various alkylalkylene groups, including alkylmethylene groups such as $-CH(CH_3)-$, $-CH(CH_2CH_3)-$, $-C(CH_3)_2-$, $-C(CH_3)(CH_2CH_3)-$, $-C(CH_3)(CH_2CH_2CH_3)-$, and $-C(CH_2CH_3)_2-$; alkylethylene groups such as $-CH(CH_3)CH_2-$, $-CH(CH_3)CH(CH_3)-$, $-C(CH_3)_2CH_2-$, $-CH(CH_2CH_3)CH_2-$, and $-C(CH_2CH_3)_2-CH_2-$; alkyltrimethylene groups such as $-CH(CH_3)CH_2CH_2-$, and $-CH_2CH(CH_3)CH_2-$; and alkyltetramethylene groups such as $-CH(CH_3)CH_2CH_2CH_2-$, and $-CH_2CH(CH_3)CH_2CH_2-$. As the alkyl group within the alkylalkylene group, a linear alkyl group of 1 to 5 carbon atoms is preferable.

The linear or branched aliphatic hydrocarbon group may or may not have a substituent. Examples of the substituent include a fluorine atom, a fluorinated alkyl group of 1 to 5 carbon atoms, and a carbonyl group.

Aliphatic Hydrocarbon Group Containing a Ring in the Structure Thereof

As examples of the hydrocarbon group containing a ring in the structure thereof, a cyclic aliphatic hydrocarbon group containing a hetero atom in the ring structure thereof and may have a substituent (a group in which two hydrogen atoms have been removed from an aliphatic hydrocarbon ring), a group in which the cyclic aliphatic hydrocarbon group is bonded to the terminal of the aforementioned chain-like aliphatic hydrocarbon group, and a group in which the cyclic aliphatic group is interposed within the aforementioned linear or branched aliphatic hydrocarbon group, can be given. As the linear or branched aliphatic hydrocarbon group, the same groups as those described above can be used.

The cyclic aliphatic hydrocarbon group preferably has 3 to 20 carbon atoms, and more preferably 3 to 12 carbon atoms.

The cyclic aliphatic hydrocarbon group may be either a polycyclic group or a monocyclic group. As the monocyclic aliphatic hydrocarbon group, a group in which 2 hydrogen atoms have been removed from a monocycloalkane is preferable. The monocycloalkane preferably has 3 to 6 carbon atoms, and specific examples thereof include cyclopentane and cyclohexane. As the polycyclic group, a group in which two hydrogen atoms have been removed from a polycycloalkane is preferable, and the polycyclic group preferably has 7 to 12 carbon atoms. Examples of the polycycloalkane include adamantane, norbornane, isobornane, tricyclodecane and tetracyclododecane.

The cyclic aliphatic hydrocarbon group may or may not have a substituent. Examples of the substituent include an alkyl group, an alkoxy group, a halogen atom, a halogenated alkyl group, a hydroxyl group and a carbonyl group.

The alkyl group as the substituent is preferably an alkyl group of 1 to 5 carbon atoms, and a methyl group, an ethyl group, a propyl group, an n-butyl group or a tert-butyl group is particularly desirable.

The alkoxy group as the substituent is preferably an alkoxy group having 1 to 5 carbon atoms, more preferably a methoxy group, ethoxy group, n-propoxy group, iso-propoxy group, n-butoxy group or tert-butoxy group, and most preferably a methoxy group or an ethoxy group.

Examples of the halogen atom for the substituent include a fluorine atom, a chlorine atom, a bromine atom and an iodine atom, and a fluorine atom is preferable. Examples of the halogenated alkyl group for the substituent include groups in which part or all of the hydrogen atoms within the aforementioned alkyl groups has been substituted with the aforementioned halogen atoms.

The cyclic aliphatic hydrocarbon group may have part of the carbon atoms constituting the ring structure thereof substituted with a substituent containing a hetero atom. As the substituent containing a hetero atom, —O—, —(C=O)—O—, —S—, $—(=O)_2—$ or $—S(=O)_2—O—$ is preferable.

Aromatic Hydrocarbon Group for $R^{P13}$

The aromatic hydrocarbon group is a hydrocarbon group having at least one aromatic ring.

The aromatic ring is not particularly limited, as long as it is a cyclic conjugated compound having (4n+2) π electrons, and may be either monocyclic or polycyclic. The aromatic ring preferably has 5 to 30 carbon atoms, more preferably 5 to 20, still more preferably 6 to 15, and most preferably 6 to 12. Here, the number of carbon atoms within a substituent(s) is not included in the number of carbon atoms of the aromatic hydrocarbon group. Examples of the aromatic ring include aromatic hydrocarbon rings, such as benzene, naphthalene, anthracene and phenanthrene; and aromatic hetero rings in which part of the carbon atoms constituting the aforementioned aromatic hydrocarbon rings has been substituted with a hetero atom. Examples of the hetero atom within the aromatic hetero rings include an oxygen atom, a sulfur atom and a nitrogen atom.

Specific examples of the aromatic hetero ring include a pyridine ring and a thiophene ring.

Specific examples of the aromatic hydrocarbon group include a group in which two hydrogen atoms have been removed from the aforementioned aromatic hydrocarbon ring or aromatic hetero ring (arylene group or heteroarylene group); a group in which two hydrogen atoms have been removed from an aromatic compound having two or more aromatic rings (biphenyl, fluorene or the like); and a group in which one hydrogen atom of the aforementioned aromatic hydrocarbon ring or aromatic hetero ring has been substituted with an alkylene group (a group in which one hydrogen atom has been removed from the aryl group within the aforementioned arylalkyl group such as a benzyl group, a phenethyl group, a 1-naphthylmethyl group, a 2-naphthylmethyl group, a 1-naphthylethyl group, or a 2-naphthylethyl group, or a heteroarylalkyl group). The alkylene group which is bonded to the aforementioned aryl group or heteroaryl group preferably has 1 to 4 carbon atoms, more preferably 1 or 2 carbon atoms, and most preferably 1 carbon atom.

With respect to the aromatic hydrocarbon group, the hydrogen atom within the aromatic hydrocarbon group may be substituted with a substituent. For example, the hydrogen atom bonded to the aromatic ring within the aromatic hydrocarbon group may be substituted with a substituent. Examples of substituents include an alkyl group, an alkoxy group, a halogen atom, a halogenated alkyl group, and a hydroxyl group.

The alkyl group as the substituent is preferably an alkyl group of 1 to 5 carbon atoms, and a methyl group, an ethyl group, a propyl group, an n-butyl group or a tert-butyl group is particularly desirable.

As the alkoxy group, the halogen atom and the halogenated alkyl group for the substituent, the same groups as the aforementioned substituent groups for substituting a hydrogen atom within the cyclic aliphatic hydrocarbon group can be used.

Divalent Linking Group Containing a Hetero Atom

In the case where $R^{P13}$ represents a divalent linking group containing a hetero atom, preferable examples of the linking group include —O—, —C(=O)—O—, —C(=O)—, —O—C(=O)—O—, —C(=O)—NH—, —NH—, —NH—C(=NH)— (may be substituted with a substituent such as an alkyl group, an acyl group or the like), —S—, $—S(=O)_2—$, $—S(=O)_2—O—$, and a group represented by general formula: $—Y^{21}—O—Y^{22}—$, $—Y^{21}—O—$, $—Y^{<}—C(=O)—O—$, $—C(=O)—O—Y^{21}—$, $—[Y^{<}—C(=O)—O]_{m''}—Y^{22}—$, $—Y^{21}—O—C(=O)—Y^{22}—$ or $—Y^{21}—S(=O)_2—O—Y^{22}—$ [in the formulae, $Y^{21}$ and $Y^{22}$ each independently represents a divalent hydrocarbon group which may have a substituent, O represents an oxygen atom, and m' represents an integer of 0 to 3].

In the case where the divalent linking group containing a hetero atom is —C(=O)—NH—, —C(=O)—NH—C(=O)—, —NH— or —NH—C(=NH)—, H may be substituted with a substituent such as an alkyl group, an acyl group or the like. The substituent (an alkyl group, an acyl group or the like) preferably has 1 to 10 carbon atoms, more preferably 1 to 8, and most preferably 1 to 5.

In general formulae —$Y^{21}$—O—$Y^{22}$—, —$Y^{21}$—O—, —$Y^{21}$—C(=O)—O—, —C(=O)—O—$Y^{21}$—, —[$Y^{21}$—C(=O)—O]$_{m''}$—$Y^{22}$—, —$Y^{21}$—O—C(=O)—$Y^{22}$— or —$Y^{21}$—S(=O)$_2$—O—$Y^{22}$—, $Y^{21}$ and $Y^{22}$ each independently represents a divalent hydrocarbon group which may have a substituent. Examples of the divalent hydrocarbon group include the same groups as those described above as the "divalent hydrocarbon group which may have a substituent" in the explanation of the aforementioned divalent linking group.

As $Y^{21}$, a linear aliphatic hydrocarbon group is preferable, more preferably a linear alkylene group, still more preferably a linear alkylene group of 1 to 5 carbon atoms, and a methylene group or an ethylene group is particularly desirable.

As $Y^{22}$, a linear or branched aliphatic hydrocarbon group is preferable, and a methylene group, an ethylene group or an alkylmethylene group is more preferable. The alkyl group within the alkylmethylene group is preferably a linear alkyl group of 1 to 5 carbon atoms, more preferably a linear alkyl group of 1 to 3 carbon atoms, and most preferably a methyl group.

In the group represented by the formula —[$Y^{21}$—C(=O)—O]$_{m}$"—$Y^{22}$—, m" represents an integer of 0 to 3, preferably an integer of 0 to 2, more preferably 0 or 1, and most preferably 1. Namely, it is particularly desirable that the group represented by the formula —[$Y^{21}$—C(=)—O]$_{m}$"—$Y^{22}$— is a group represented by the formula —$Y^{21}$—C(=O)—O—$Y^{22}$—. Among these, a group represented by the formula —$(CH_2)_{a'}$—C(=O)—O—$(CH_2)_{b'}$— is preferable. In the formula, a' is an integer of 1 to 10, preferably an integer of 1 to 8, more preferably an integer of 1 to 5, still more preferably 1 or 2, and most preferably 1. b' is an integer of 1 to 10, preferably an integer of 1 to 8, more preferably an integer of 1 to 5, still more preferably 1 or 2, and most preferably 1.

As $R^{P13}$, a single bond, or a linear or branched alkylene group is preferable, a linear alkylene group is more preferable, and a linear alkylene group of 1 to 4 carbon atoms is still more preferable.

In general formula (u1-1-1), $R^{P14}$ represents an organic group having a hyperbranched structure containing a silicon atom, wherein at least a part of the terminal of the hyperbranched structure is a group containing a polar group.

The organic group having a hyperbranched structure containing a silicon atom is the same as defined for the "organic group having a hyperbranched structure containing a silicon atom" for $R^{P11}$. Among these examples, as the organic group having a hyperbranched structure containing a silicon atom for $R^{P14}$, an organic group having a hyperbranched structure containing a partial structure represented by general formula (P101) described later, or an organic group having a hyperbranched structure containing a partial structure represented by general formula (P101) described later and a partial structure represented by general formula (P102) described later is preferable.

Examples of the group containing a polar group include a group represented by general formula ($R^{P15}$-1) shown below, a group represented by general formula ($RP^{P15}$-2) shown below, and a group represented by general formula ($RP^{P15}$-3) shown below.

[Chemical Formula 3]

($R^{P15}$-1)

($R^{P15}$-2)

($R^{P15}$-3)

In the formulae, $R_O$ represents —OH, —C(=O)OH or a hydrocarbon group containing —O—, —C(=O)—, —C(=O)—O— or —OH in the structure thereof; $R_S$ represents —SH, —$SO_3H$ or a hydrocarbon group containing —S—, —C(=S)—, —S(=O)—, —S(=O)$_2$— or —S(=O)$_2$—O— in the structure thereof; and $R_N$ represents —$NH_2$ or a hydrocarbon group containing —N=, —NH— or —C(=O)NH— in the structure thereof.

In general formula ($R^{P15}$-1), $R_O$ represents —OH, —C(=O)OH or a hydrocarbon group containing —O—, —C(=O)—, —C(=O)—O— or —OH in the structure thereof.

With respect to the "hydrocarbon group containing —O—, —C(=O)—, —C(=O)—O— or —OH in the structure thereof" for $R_O$, the hydrocarbon group may be either an aliphatic hydrocarbon group or an aromatic hydrocarbon group.

The aliphatic hydrocarbon group may be either saturated or unsaturated, but in general, the aliphatic hydrocarbon group is preferably saturated.

Examples of the aliphatic hydrocarbon group include a cyclic group which may have a substituent, a chain alkyl group which may have a substituent, and a chain alkenyl group which may have a substituent.

With respect to "hydrocarbon group containing —O—, —C(=O)—, —C(=O)—O— or —OH in the structure thereof for $R_O$, the cyclic group is preferably a cyclic hydrocarbon group. The cyclic hydrocarbon group may be an aromatic hydrocarbon group or an aliphatic hydrocarbon group.

With respect to the "hydrocarbon group containing —O—, —C(=O)—, —C(=O)—O— or —OH in the structure thereof for $R_O$, examples of the aromatic hydrocarbon group include an aryl group in which 1 hydrogen atom has been removed from the aromatic hydrocarbon ring or the aromatic compound having two or more aromatic rings mentioned in relation to the divalent aromatic hydrocarbon group for $R^{P13}$ in the aforementioned general formula (u1-1-1). As the aromatic hydrocarbon group, a phenyl group or a naphthyl group is preferable.

With respect to the "hydrocarbon group containing —O—, —C(=O)—, —C(=O)—O— or —OH in the structure thereof for $R_O$, examples of the cyclic apliphatic hydrocarbon group include a group in which 1 hydrogen atom has been removed from the monocycloalkane or the polycycloalkane mentioned in relation to the divalent hydrocarbon group for $R^{P13}$ in the aforementioned general formula (u1-1-1). As the cyclic aliphatic hydrocarbon group, a cyclopentyl group or a cyclohexyl group is preferable.

Examples of the substituent for the cyclic hydrocarbon group in the "hydrocarbon group containing —O—, —C(=O)—, —C(=O)—O— or —OH in the structure thereof for $R_O$ include an alkyl group, an alkoxy group, a halogen atom, a halogenated alkyl group, a hydroxyl group, a carbonyl group and a nitro group.

The alkyl group as the substituent is preferably an alkyl group of 1 to 5 carbon atoms, and a methyl group, an ethyl group, a propyl group, an n-butyl group or a tert-butyl group is particularly desirable.

The alkoxy group as the substituent is preferably an alkoxy group having 1 to 5 carbon atoms, more preferably a methoxy group, ethoxy group, n-propoxy group, iso-propoxy group, n-butoxy group or tert-butoxy group, and most preferably a methoxy group or an ethoxy group.

Examples of the halogen atom for the substituent include a fluorine atom, a chlorine atom, a bromine atom and an iodine atom, and a fluorine atom is preferable.

Example of the aforementioned halogenated alkyl group includes a group in which a part or all of the hydrogen atoms within an alkyl group of 1 to 5 carbon atoms (e.g., a methyl group, an ethyl group, a propyl group, an n-butyl group or a tert-butyl group) have been substituted with the aforementioned halogen atoms.

The chain alkyl group in the "hydrocarbon group containing —O—, —C(═O)—, —C(═O)—O— or —OH in the structure thereof for $R_O$ may be linear or branched.

The linear alkyl group preferably has 1 to 20 carbon atoms, more preferably 1 to 15, and most preferably 1 to 10. Specific examples include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an icosyl group, a henicosyl group and a docosyl group.

The branched alkyl group preferably has 3 to 20 carbon atoms, more preferably 3 to 15, and most preferably 3 to 10. Specific examples include a 1-methylethyl group, a 1-methylpropyl group, a 2-methylpropyl group, a 1-methylbutyl group, a 2-methylbutyl group, a 3-methylbutyl group, a 1-ethylbutyl group, a 2-ethylbutyl group, a 1-methylpentyl group, a 2-methylpentyl group, a 3-methylpentyl group and a 4-methylpentyl group.

The chain alkenyl group in the "hydrocarbon group containing —O—, —C(═O)—, —C(═O)—O— or —OH in the structure thereof" for $R_O$ may be linear or branched. The chain alkenyl group preferably has 2 to 10 carbon atoms, more preferably 2 to 5 carbon atoms, still more preferably 2 to 4 carbon atoms, and most preferably 3 carbon atoms.

Examples of linear alkenyl groups include a vinyl group, a propenyl group (an allyl group) and a butynyl group. Examples of branched alkenyl groups include a 1-methylpropenyl group and a 2-methylpropenyl group.

Examples of the substituent for the chain alkyl group of the chain alkenyl group in the "hydrocarbon group containing —O—, —C(═O)—, —C(═O)—O— or —OH in the structure thereof for $R_O$ include an alkoxy group, a ahalogen atom, a halogenated alkyl group, a hydroxy group, a carbonyl group, a nitro group, an amino group, and a cyclic group in the "hydrocarbon group containing —O—, —C(═O)—, —C(═O)—O— or —OH in the structure thereof for $R_O$.

As the group represented by general formula ($R^{P15}$-1), a group represented by any one of chemical formulae ($R^{P15}$-1-1) to ($R^{P15}$-1-9) shown below is preferable. In chemical formula ($R^{P15}$-1-9), npl is an integer of 1 to 10.

[Chemical Formula 4]

($R^{P15}$-1-1)

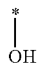

($R^{P15}$-1-2)

($R^{P15}$-1-3)

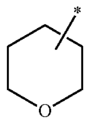

($R^{P15}$-1-4)

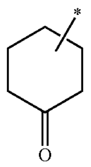

($R^{P15}$-1-5)

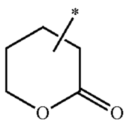

($R^{P15}$-1-6)

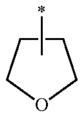

($R^{P15}$-1-7)

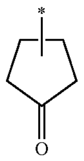

($R^{P15}$-1-8)

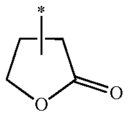

($R^{P15}$-1-9)

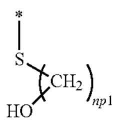

In general formula ($R^{P15}$-2), $R_S$ represents —SH, —$SO_3H$ or a hydrocarbon group containing —S—, —C(═S)—, —S(═O)—, —$S(═O)_2$— or —$S(═O)_2$—O— in the structure thereof.

The hydrocarbon group in the "hydrocarbon group containing —S—, —C(═S)—, —S(═O)—, —$S(═O)_2$— or —$S(═O)_2$—O— in the structure thereof for $R_S$ is the same as defined for the hydrocarbon group in the "hydrocarbon group containing —O—, —C(═O)—, —C(═O)—O— or —OH in the structure thereof for $R_O$ in the aforementioned general formula ($R^{P15}$-1).

As the group represented by general formula ($RP^{15}$-2), a group represented by any one of chemical formulae ($R^{P15}$-2-1) to ($R^{P15}$-2-12) shown below is preferable.

[Chemical Formula 5]

($R^{P15}$-2-1)

($R^{P15}$-2-2)

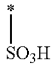

($R^{P15}$-2-3)

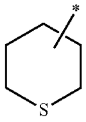

($R^{P15}$-2-4)

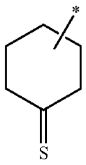

($R^{P15}$-2-5)

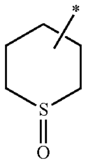

($R^{P15}$-2-6)

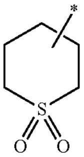

($R^{P15}$-2-7)

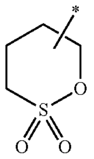

($R^{P15}$-2-8)

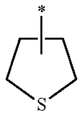

($R^{P15}$-2-9)

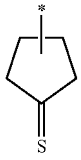

($R^{P15}$-2-10)

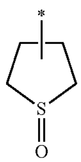

-continued ($R^{P15}$-2-11)

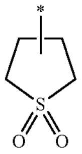

($R^{P15}$-2-12)

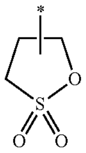

In general formula ($R^{P15}$-3), $R_N$ represents —$NH_2$ or a hydrocarbon group containing —N═, —NH— or —C(═O)NH— in the structure thereof.

The hydrocarbon group in the "hydrocarbon group containing —N═, —NH— or —C(═O)NH— in the structure thereof for $R_N$ is the same as defined for the hydrocarbon group in the "hydrocarbon group containing —O—, —C(═O)—, —C(═O)—O— or —OH in the structure thereof for $R_O$ in the aforementioned general formula ($R^{P15}$-1).

As the group represented by general formula ($R^{1315}$-3), a group represented by any one of chemical formulae ($R^{P15}$-3-1) to ($R^{P15}$-3-8) shown below is preferable.

In formula ($R^{P15}$-3-2), $R^{p151}$ represents an arbitrary organic group. The organic group for $R^{p151}$ is not particularly limited, and examples thereof include a monovalent hydrocarbon group corresponding to the divalent hydrocarbon group (which may have a substituent) for $R^{P13}$ in the aforementioned general formula (u1-1-1).

[Chemical Formula 6]

($R^{P15}$-3-1)

($R^{P15}$-3-2)

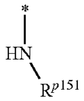

($R^{P15}$-3-3)

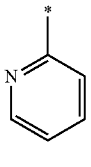

($R^{P15}$-3-4)

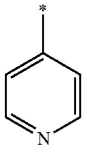

($R^{P15}$-3-5)

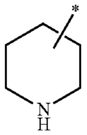

-continued ($R^{P15}$-3-6)

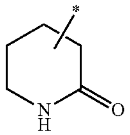

($R^{P15}$-3-7)

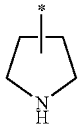

($R^{P15}$-3-8)

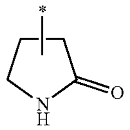

In general formula (ul-1-1), the group containing a polar group for $R^{P14}$ is preferably at least one member selected from the group consisting of groups represented by any of the aforementioned chemical formulae ($R^{P15}$-1-1) to ($R^{P15}$-1-9), the aforementioned chemical formulae ($R^{P15}$-2-1) to ($R^{P15}$-2-12) and the aforementioned chemical formulae ($R^{P15}$-3-1) to ($R^{P15}$-3-8).

In the present embodiment, the polymer (P1) preferably has a partial structure represented by general formula (P101) shown below.

[Chemical Formula 7]

(P101)

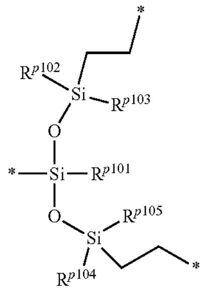

In the formula, $R^{P101}$ to $R^{P105}$ each independently represents a hydrogen atom, an alkyl group of 1 to 6 carbon atoms, an alkoxy group of 1 to 6 carbon atoms or a hydroxyalkyl group of 1 to 6 carbon atoms; and * represents a valence bond.

In general formula (P101), $R^{P101}$ to $R^{P105}$ each independently represents a hydrogen atom, an alkyl group of 1 to 6 carbon atoms, an alkoxy group of 1 to 6 carbon atoms or a hydroxyalkyl group of 1 to 6 carbon atoms.

The alkyl group of 1 to 6 carbon atoms for $R^{P101}$ to $R^{P105}$ is preferably linear or branched. Specific examples include a methyl group, an ethyl group, a propyl group, an isopropyl group, an n-butyl group, an isobutyl group, a tert-butyl group, a pentyl group, an isopentyl group, a neopentyl group and a hexyl group.

The alkoxy group of 1 to 6 carbon atoms for $R^{P101}$ to $R^{P105}$ is preferably linear or branched. Specific examples of the alkoxy groups include the aforementioned alkyl groups for $R^{P101}$ to $R^{P105}$ having an oxygen atom (—O—) bonded thereto.

Examples of the hydroxyalkyl group for $R^{P101}$ to $R^{P105}$ include groups in which at least one hydrogen atom of the aforementioned alkyl groups for $R^{P101}$ to $R^{P105}$ has been substituted with a hydroxyl group.

Among these examples, as $R^{P101}$ to $R^{P105}$, a methyl group or an ethyl group is preferable, and a methyl group is most preferable.

In the present embodiment, the polymer (P1) has, in addition to the partial structure represented by general formula (P101), a partial structure represented by general formula (P102) shown below.

[Chemical Formula 8]

(P102)

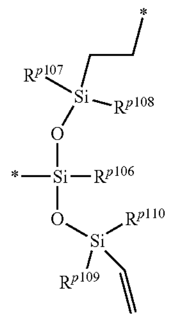

In the formula, $R^{P106}$ to $R^{P110}$ each independently represents a hydrogen atom, an alkyl group of 1 to 6 carbon atoms, an alkoxy group of 1 to 6 carbon atoms or a hydroxyalkyl group of 1 to 6 carbon atoms; and * represents a valence bond.

In general formula (P102), $R^{P106}$ to $R^{P110}$ each independently represents a hydrogen atom, an alkyl group of 1 to 6 carbon atoms, an alkoxy group of 1 to 6 carbon atoms or a hydroxyalkyl group of 1 to 6 carbon atoms. The alkyl group of 1 to 6 carbon atoms, the alkoxy group of 1 to 6 carbon atoms and the hydroxyalkyl group of 1 to 6 carbon atoms for $R^{P106}$ to $R^{P110}$ are the same as defined for the alkyl group of 1 to 6 carbon atoms, the alkoxy group of 1 to 6 carbon atoms and the hydroxyalkyl group of 1 to 6 carbon atoms for $R^{P101}$ to $R^{P105}$ in the aforementioned general formula (P101).

<Second Block>

In the present embodiment, examples of the second block include a polymer having a repeating structure of a structural unit having an aromatic group; a polymer having a repeating structure of a structural unit derived from acrylic acid which may have the hydrogen atom bonded to the carbon atom on the α-position substituted with a substituent (hereafter, sometimes referred to as "(α-substituted) acrylic acid"); a polymer having a repeating structure of a structural unit derived from an acrylate ester which may have the hydrogen atom bonded to the carbon atom on the α-position substituted with a substituent (hereafter, sometimes referred to as "(α-substituted) acrylate ester"); a polymer having a repeating structure of a structural unit derived from a siloxane; and a polymer having a repeating structure of a structural unit derived from an alkyleneoxide.

Examples of the structural unit having an aromatic group include structural units having a phenyl group, a naphthyl group or the like. In the present embodiment, a structural unit derived from styrene or a derivative thereof is preferable. Examples of the styrene derivative include α-methylstyrene, 2-methylstyrene, 3-methylstyrene, 4-methylstyrene, 4-t-butylstyrene, 4-n-octylstyrene, 2,4,6-trimethylstyrene, 4-methoxystyrene, 4-t-butoxystyrene, 4-hydroxystyrene, 4-nitrostyrene, 3-nitrostyrene, 4-chlorostyrene, 4-fluorostyrene, 4-acetoxyvinylstyrene, 4-vinylbenzylchloride, 1-vinylnaphthalene, 4-vinylbiphenyl, 1-vinyl-2-pyrolidone, 9-vinylanthracene, and vinylpyridine.

An (α-substituted) acrylic acid refers to either or both acrylic acid and a compound in which the hydrogen atom bonded to the carbon atom on the α-position of acrylic acid has been substituted with a substituent. As an example of such a substituent, an alkyl group of 1 to 5 carbon atoms can be given.

Examples of (α-substituted) acrylic acid include acrylic acid and methacrylic acid.

An (α-substituted) acrylate ester refers to either or both acrylate ester and a compound in which the hydrogen atom bonded to the carbon atom on the α-position of acrylate ester has been substituted with a substituent. As an example of such a substituent, an alkyl group of 1 to 5 carbon atoms can be given.

Specific examples of the (α-substituted) acrylate ester include acrylate esters such as methyl acrylate, ethyl acrylate, propyl acrylate, n-butyl acrylate, t-butyl acrylate, cyclohexyl acrylate, octyl acrylate, nonyl acrylate, hydroxyethyl acrylate, hydroxypropyl acrylate, benzyl acrylate, anthracene acrylate, glycidyl acrylate, 3,4-epoxycyclohexylmethane acrylate, and propyltrimethoxysilane acrylate; and methacrylate esters such as methyl methacrylate, ethyl methacrylate, propyl methacrylate, n-butyl methacrylate, t-butyl methacrylate, cyclohexyl methacrylate, octyl methacrylate, nonyl methacrylate, hydroxyethyl methacrylate, hydroxypropyl methacrylate, benzyl methacrylate, anthracene methacrylate, glycidyl methacrylate, 3,4-epoxycyclohexylmethane methacrylate, and propyltrimethoxysilane methacrylate.

Among these, methyl acrylate, ethyl acrylate, t-butyl acrylate, methyl methacrylate, ethyl methacrylate, and t-butyl methacrylate are preferable.

Examples of siloxane or derivative thereof include dimethylsiloxane, diethylsiloxane, diphenylsiloxane, and methylphenylsiloxane.

Examples of the alkylene oxide include ethylene oxide, propylene oxide, isopropylene oxide and butylene oxide.

Among these examples, as the second block, a polymer having a repeating structure of a structural unit derived from styrene; a polymer having a repeating structure of a structural unit derived from an acrylate ester which may have the hydrogen atom bonded to the carbon atom on the α-position substituted with a substituent; a polymer having a repeating structure of a structural unit derived from acrylic acid which may have the hydrogen atom bonded to the carbon atom on the α-position substituted with a substituent; a polymer having a repeating structure of a structural unit derived from a siloxane; or a polymer having a repeating structure of a structural unit derived from an alkyleneoxide is preferable.

In the present embodiment, the number average molecular weight (Mn) (the polystyrene equivalent value determined by gel permeation chromatography) of the block copolymer is preferably 5,000 to 2,000,000, more preferably 5,000 to 1,000,000, and still more preferably 5,000 to 500,000.

The polydispersity (Mw/Mn) of the block copolymer is preferably 1.0 to 3.0, more preferably 1.0 to 1.5, and still more preferably 1.0 to 1.3. Mw indicates the weight average molecular weight.

In the present embodiment, the weight ratio of the first block to the second block is preferably 10:90 to 90:10, and more preferably 15:85 to 85:15.

The block copolymer according to the present embodiment may be preferably used as a resin composition for forming a phase-separated structure. In the case of using the block copolymer as a resin composition for forming a phase-separated structure, it is preferable to prepare the resin composition by dissolving the block copolymer according to the present embodiment in an organic solvent.

Organic Solvent

The organic solvent may be any organic solvent which can dissolve the respective components to give a uniform solution, and one or more kinds of any organic solvent can be appropriately selected from those which have been conventionally known as solvents for a film composition containing a resin as a main component.

Examples thereof include halogenated hydrocarbons such as methylchloride, dichloromethane, chloroform, ethyl chloride, dichloroethane, n-propylchloride, n-butylchloride and chlorobenzene; lactones such as γ-butyrolactone; ketones such as acetone, methyl ethyl ketone, cyclohexanone, methyl-n-pentyl ketone, methyl isopentyl ketone, and 2-heptanone (methylamyl ketone); polyhydric alcohols, such as ethylene glycol, diethylene glycol, propylene glycol and dipropylene glycol; compounds having an ester bond, such as ethylene glycol monoacetate, diethylene glycol monoacetate, propylene glycol monoacetate, and dipropylene glycol monoacetate; polyhydric alcohol derivatives including compounds having an ether bond, such as a monoalkylether (e.g., monomethylether, monoethylether, monopropylether or monobutylether) or monophenylether of any of these polyhydric alcohols or compounds having an ester bond (among these, propylene glycol monomethyl ether acetate (PGMEA) and propylene glycol monomethyl ether (PGME) are preferable); cyclic ethers such as dioxane; esters such as methyl lactate, ethyl lactate (EL), methyl acetate, ethyl acetate, butyl acetate, methyl pyruvate, ethyl pyruvate, methyl methoxypropionate, and ethyl ethoxypropionate; and aromatic organic solvents such as anisole, ethylbenzylether, cresylmethylether, diphenylether, dibenzylether, phenetole, butylphenylether, ethylbenzene, diethylbenzene, pentylbenzene, isopropylbenzene, toluene, xylene, cymene and mesitylene.

These solvents can be used individually, or in combination as a mixed solvent.

Among these examples, chloroform, 2-heptanone, propylene glycol monomethyl ether acetate (PGMEA), propylene glycol monomethyl ether (PGME), cyclohexanone and EL is preferable.

Further, among the mixed solvents, a mixed solvent obtained by mixing PGMEA with a polar solvent is preferable. The mixing ratio (weight ratio) of the mixed solvent can be appropriately determined, taking into consideration the compatibility of the PGMEA with the polar solvent, but is preferably in the range of 1:9 to 9:1, more preferably from 2:8 to 8:2. For example, when EL is mixed as the polar solvent, the PGMEA:EL weight ratio is preferably from 1:9 to 9:1, and more preferably from 2:8 to 8:2. Alternatively, when PGME is mixed as the polar solvent, the PGMEA:PGME weight ratio is preferably from 1:9 to 9:1, more preferably from 2:8 to 8:2, and still more preferably 3:7 to 7:3. Alternatively, when PGME and cyclohexanone is mixed as the polar solvent, the PGMEA:(PGME+cyclohexanone) weight ratio is preferably from 1:9 to 9:1, more preferably from 2:8 to 8:2, and still more preferably 3:7 to 7:3.

Further, as the organic solvent for the resin composition for forming a phase-separated structure, a mixed solvent of γ-butyrolactone with PGMEA, EL or the aforementioned mixed solvent of PGMEA with a polar solvent, is also preferable. The mixing ratio (former:latter) of such a mixed solvent is preferably from 70:30 to 95:5.

The amount of the organic solvent in the resin composition for forming a phase-separated structure is not particularly limited, and is adjusted appropriately to a concentration that enables application of a coating solution depending on the thickness of the coating film. In general, the organic solvent is used in an amount that yields a solid content for the block copolymer that is within a range from 0.2 to 70% by weight, and preferably from 0.2 to 50% by weight.

The block copolymer according to the present embodiment is capable of forming a regular periodic structure. Therefore, the block copolymer according to the present embodiment is preferable for self-directed assembly lithography.

The block copolymer according to the present embodiment has a first block consisting of a polymer (P1) having a repeating structure of a structural unit (u1) containing in a side chain thereof a hyperbranched structure containing a silicon atom. Therefore, it is presumed that the block copolymer according to the present embodiment has a high silicon atom density, and resolution and etching selectivity ratio in the formation of a pattern by phase-separation are improved.

Further, a hyperbranched structure may have many reactive groups such as vinyl groups introduced. In the case where many reactive groups such as vinyl groups have been introduced into the hyperbranched structure, many polar groups may be introduced into the hyperbranched structure. By introducing many polar groups at the terminals of the hyperbranched structure, hydrophilicity/hydrophobicity of each block constituting the block copolymer may be adjusted. As a result, it is presumed that the perpendicularity of a pattern formed by phase-separation is improved.

Further, the block copolymer according to the present embodiment is capable of forming a phase-separated structure at a low annealing temperature, as compared to a block copolymer containing polyhedral oligomeric silsesquioxane (POSS).

<<Method of Producing Block Copolymer>>

The block copolymer according to the present embodiment may be produced, for example, by a method including a step (A) of polymerizing a block copolymer precursor, and a step (B) of introducing a hyperbranched structure containing a silicon atom into the block copolymer precursor.

[Step (A)]

In step (A), a block copolymer precursor is polymerized.

In step (A), for example, by living anion polymerization or the like, a block corresponding to the second block is polymerized. Then, as shown in the reaction formula below, for example, a cyclotrisiloxane compound is reacted, and trimethylsilylchloride is used to temporarily terminate the reaction, so as to obtain a block copolymer precursor represented by general formula (Pre-BCP) shown below.

[Chemical Formula 9]

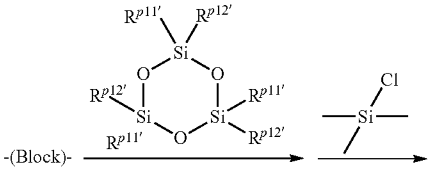

-continued

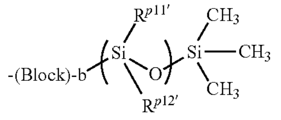

(Pre-BCP)

[In the formula, $R^{P11'}$ represents an organic group containing a reactive group; and $R^{P12'}$ represents an alkyl group, a halogenated alkyl group, a hydrogen atom or an organic group containing a reactive group.

In general formula (Pre-BCP), $R^{P11'}$ represents an organic group containing a reactive group.

An "organic group containing a reactive group" includes a reactive group itself.

A reactive group refers to a group which is capable of reacting with another portion by a chemical reaction.

Examples of the reactive group include a vinyl group, an allyl group, a (meth)acryloyl group, a styryl group, an oxiranyl group, an oxetanyl group, a carboxy group, a hydroxy group, a thiacyclopropyl group, a sulfanyl group, an isocyanato group, an amino group and an ureido group. Among these examples, as the reactive group, a vinyl group or an allyl group is preferable, and a vinyl group is most preferable.

The organic group for $R^{P11'}$ is not particularly limited, and examples thereof include a monovalent hydrocarbon group corresponding to the divalent hydrocarbon group (which may have a substituent) for $R^{P13}$ in the aforementioned general formula (u1-1-1).

Among these examples, as $R^{P11'}$, a vinyl group, an organic group containing a vinyl group or an allyl group is preferable, and a vinyl group is most preferable.

In general formula (Pre-BCP), $R^{P12'}$ represents an alkyl group, a halogenated alkyl group, a hydrogen atom or an organic group containing a reactive group.

The organic group containing a reactive group for $R^{P12'}$ is the same as defined for the organic group containing a reactive group for $R^{P11'}$.

The alkyl group and the halogenated alkyl group for $R^{P12'}$ are the same as defined for the alkyl group and the halogenated alkyl group for $R^{P12}$ in the aforementioned general formula (u1-1), respectively.

Among these examples, as $R^{P12'}$, an alkyl group, a halogenated alkyl group or a hydrogen atom is preferable, an alkyl group of 1 to 5 carbon atoms, a halogenated alkyl group of 1 to 5 carbon atoms or a hydrogen atom is more preferable, and a methyl group or a hydrogen atom is most preferable.

[Step (B)]

In step (B), a hyperbranched structure containing a silicon atom is introduced into the block copolymer precursor. Specifically, as shown in the chemical formula below, the block copolymer precursor is reacted with a monomer which derives a hyperbranched structure containing a silicon atom (hereafter, referred to as "Monomer (HB)") in the presence of a catalyst, to obtain a block copolymer having a hyperbranched structure containing a silicon atom introduced therein (general formula (BCP) shown below).

[Chemical Formula 10]

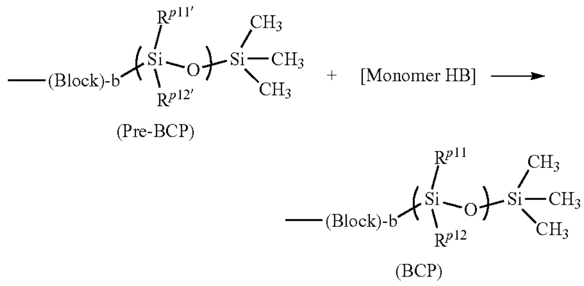

(Pre-BCP)
(BCP)

In the formula, $R^{p11'}$, $R^{p12'}$, $R^{p11}$ and $R^{p12}$ are the same as defined above.

In the present embodiment, in the case of introducing a polar group at a terminal of the hyperbranched structure, for example, the block copolymer is reacted with a compound having a group containing a polar group. As the compound having a group containing a polar group, a compound having a thiol group is preferable.

By using a compound having a thiol group, a block copolymer having a polar group introduced at a terminal of the hyperbranched structure (BCP-Pol) can be obtained by an ene-thiol reaction.

[Chemical Formula 11]

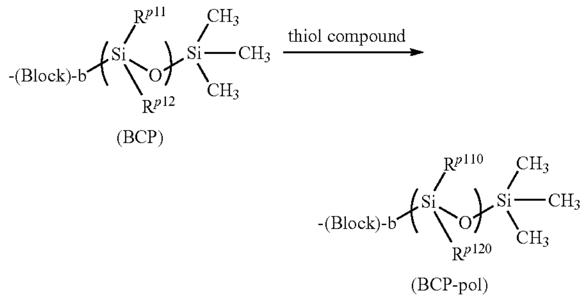

(BCP)
(BCP-pol)

In the formula, $R^{p11}$ and $R^{p12}$ are the same as defined above; $R^{P110}$ represents an organic group having a hyperbranched structure containing a silicon atom, wherein at least a part of the terminal of the hyperbranched structure is a group containing a polar group; and $R^{P120}$ represents an alkyl group, a halogenated alkyl group, a hydrogen atom or an organic group having a hyperbranched structure containing a silicon atom, wherein at least a part of the terminal of the hyperbranched structure is a group containing a polar group.

In formula (BCP-pol), the organic group having a hyperbranched structure containing a silicon atom for $R^{P110}$ and $R^{P120}$ is the same as defined for the organic group having a hyperbranched structure containing a silicon atom for $R^{p11}$ and $R^{p12}$ in the aforementioned general formula (u1-1).

In formula (BCP-pol), the alkyl group and the halogenated alkyl group for $R^{P120}$ are the same as defined for the alkyl group and the halogenated alkyl group for $R^{p12}$ in the aforementioned general formula (u1-1).

In formula (BCP-pol), the polar group introduced at the terminal of the organic group having a hyperbranched structure containing a silicon atom for $R^{P110}$ and $R^{P120}$ is the same as defined for the polar group described above in relation to the structural unit (u1).

<<Method of Forming Structure Containing Phase-Separated Structure>>

A method of forming a structure containing a phase-separated structure using the block copolymer according to the present embodiment will be described.

The method of producing a structure containing a phase-separated structure includes a step (i) in which a layer containing the block copolymer according to the present embodiment is formed on a substrate, and a step (ii) in which the layer containing the block copolymer is phase-separated.

In the method of producing a structure containing a phase-separated structure according to the present embodiment, it is preferable to include, prior to the step (i), a step of applying a brush composition to form a brush layer (hereafter, referred to as "brush layer forming step").

Hereinafter, the method of producing a structure containing a phase-separated structure will be specifically described with reference to FIG. 1. However, the present invention is not limited to these embodiments.

FIG. 1 shows an example of one embodiment of the method of forming a structure containing a phase-separated structure.

Firstly, a brush composition is applied to a substrate 1, so as to form a brush layer 2 (FIG. 1 (I)).

Then, to the brush layer 2, the resin composition for forming a phase-separated structure according to the first aspect (resin composition) is applied, so as to form a layer 3 containing a block copolymer (BCP layer 3) (FIG. 1(II); step (i)).

Next, heating is conducted to perform an annealing treatment, so as to phase-separate the BCP layer 3 into a phase 3*a* and a phase 3*b* (FIG. 1 (III); step (ii)).

According to the production method of the present embodiment, that is, the production method including the steps (i) and (ii), a structure 3' containing a phase-separated structure is formed on the substrate 1 having the brush layer 2 formed thereon.

[Step (i)]

In step (i), the resin composition for forming a phase-separated structure is applied to the substrate 1, so as to form a BCP layer 3.

There are no particular limitations on the type of a substrate, provided that the resin composition for forming a phase-separated structure can be coated on the surface of the substrate.

Examples of the substrate include a substrate constituted of an inorganic substance such as a metal (e.g., silicon, copper, chromium, iron or aluminum), glass, titanium oxide, silica or mica; and a substrate constituted of an organic substance such as an acrylic plate, polystyrene, cellulose, cellulose acetate or phenol resin.

The size and the shape of the substrate is not particularly limited. The substrate does not necessarily need to have a smooth surface, and a substrate made of various materials and having various shapes can be appropriately selected for use. For example, a multitude of shapes can be used, such as a substrate having a curved surface, a plate having an uneven surface, and a thin sheet.

On the surface of the substrate, an inorganic and/or organic film may be provided. As the inorganic film, an inorganic antireflection film (inorganic BARC) can be used. As the organic film, an organic antireflection film (organic BARC) can be used.

Before forming a BCP layer 3 on the substrate 1, the surface of the substrate 1 may be cleaned. By cleaning the surface of the substrate, application of the resin composition for forming a phase-separated structure or the brush composition to the substrate 1 may be satisfactorily performed.

As the cleaning treatment, a conventional method may be used, and examples thereof include an oxygen plasma treatment, a hydrogen plasma treatment, an ozone oxidation treatment, an acid alkali treatment, and a chemical modification treatment. For example, the substrate is immersed in an acidic solution such as a sulfuric acid/hydrogen peroxide aqueous solution, followed by washing with water and drying. Thereafter, a BCP layer 3 or a brush layer 2 is formed on the surface of the substrate.

Before forming a BCP layer 3 on the substrate 1, the surface of the substrate 1 may be cleaned.

A neutralization treatment is a treatment in which the surface of the substrate is modified so as to have affinity for all polymers constituting the block copolymer. By the neutralization treatment, it becomes possible to prevent only phases of specific polymers to come into contact with the surface of the substrate by phase separation. For example, prior to forming a BCP layer 3, on the surface of the substrate 1, it is preferable to form a brush layer 2 depending on the kind of block copolymer to be used. As a result, by phase-separation of the BCP layer 3, a cylinder structure or lamellar structure oriented in a direction perpendicular to the surface of the substrate 1 can be reliably formed.

Specifically, on the surface of the substrate 1, a brush layer 2 is formed using a brush composition having affinity for all polymers constituting the block copolymer.

The brush composition can be appropriately selected from conventional resin compositions used for forming a thin film, depending on the kind of polymers constituting the block copolymer.

Examples of the brush composition include a composition containing a resin which has all structural units of the polymers constituting the block copolymer, and a composition containing a resin which has all structural units having high affinity for the polymers constituting the block copolymer.

For example, when a PS-PMMA block copolymer is used, as the brush composition, it is preferable to use a resin composition containing both PS and PMMA, or a compound or a composition containing both a portion having a high affinity for an aromatic ring and a portion having a high affinity for a functional group with high polarity.

Examples of the resin composition containing both PS and PMMA include a random copolymer of PS and PMMA, an alternating polymer of PS and PMMA (a copolymer in which the respective monomers are alternately copolymerized), and a block copolymer of PS and PMMA.

Examples of the composition containing both a portion having a high affinity for PS and a portion having a high affinity for PMMA include a resin composition obtained by polymerizing at least a monomer having an aromatic ring and a monomer having a substituent with high polarity. Examples of the monomer having an aromatic ring include a monomer having a group in which one hydrogen atom has been removed from the ring of an aromatic hydrocarbon, such as a phenyl group, a biphenyl group, a fluorenyl group, a naphthyl group, an anthryl group or a phenanthryl group, or a monomer having a hetero aryl group such as the aforementioned group in which part of the carbon atoms constituting the ring of the group has been substituted with a hetero atom such as an oxygen atom, a sulfur atom or a nitrogen atom. Examples of the monomer having a substituent with high polarity include a monomer having a carboxy group, a hydroxy group, a cyano group or a hydroxyalkyl group in which part of the hydrogen atoms of the alkyl group has been substituted with fluorine atoms.

Further, as the brush composition, for example, a heat-polymerizable resin composition, or a photosensitive resin composition such as a positive resist composition or a negative resist composition can also be mentioned.

The brush layer may be formed by a conventional method.

The method of applying the brush composition to the substrate 1 to form a brush layer 2 is not particularly limited, and the brush layer 2 can be formed by a conventional method.

For example, the brush composition can be applied to the substrate 1 by a conventional method using a spinner or the like to form a coating film on the substrate 1, followed by drying, thereby forming a brush layer 2.

The drying method of the coating film is not particularly limited, provided it can volatilize the solvent contained in the brush composition, and the coating film is immobilized on the substrate. The method of immobilizing the coating film on the substrate is preferably an adsorptive immobilization method. Examples of the drying method include a baking method. The baking temperature is preferably 80° C. to 300° C., more preferably 90° C. to 270° C., and still more preferably 100° C. to 250° C. The baking time is preferably 30 seconds to 500 seconds, and more preferably 30 seconds to 250 seconds.

The thickness of the brush layer 2 after drying of the coating film is preferably about 3 to 100 nm, and more preferably about 5 to 50 nm.

Subsequently, on the brush layer 2, a layer 3 containing a block copolymer having a plurality of blocks bonded (BCP layer 3) is formed.

The method of forming the BCP layer 3 on the brush layer 2 is not particularly limited, and examples thereof include a method in which the resin composition is applied to the brush layer 2 by a conventional method using spincoating or a spinner, followed by drying.

Regarding the method of drying the coating film of the resin composition, the baking is temperature is, for example, preferably from 60 to 150° C., and more preferably from 80 to 130° C. The baking time is, for example, preferably from 10 to 3,000 seconds, and more preferably from 20 to 120 seconds.

The BCP layer 3 may have a thickness satisfactory for phase-separation to occur. In consideration of the kind of the substrate 1, the structure period size of the phase-separated structure to be formed, and the uniformity of the nanostructure, the thickness is preferably 10 to 100 nm, and more preferably 15 to 80 nm.

[Step (ii)]

Step (ii), the layer 3 containing a block copolymer formed on the substrate 1 is phase-separated.

By heating the substrate 1 after step (i) to conduct the anneal treatment, the block copolymer is selectively removed, such that a phase-separated structure in which at least part of the surface of the substrate 1 is exposed is formed. That is, on the substrate 1, a structure 3' containing a phase-separated structure in which phase **3*a* and phase 3*b*** are phase separated is produced.

The anneal treatment is preferably conducted at a temperature at least as high as the glass transition temperature of the block copolymer used and lower than the heat decomposition temperature. For example, in the case where the block copolymer according to the present embodiment is used, the anneal treatment is preferably conducted at 40 to 350° C., more preferably 50 to 300° C., and most preferably 70 to 120° C. The heating time is preferably 30 to 3,600 seconds, and more preferably 120 to 600 seconds.

Further, the anneal treatment is preferably conducted in a low reactive gas such as nitrogen.

By the method of producing a structure containing a phase-separated structure according to the present embodiment described heretofore, the phase-separation performance of the block copolymer can be enhanced, and a fine structure with a good shape can be formed, as compared to conventional lithography techniques.

In addition, on the surface of the substrate, a substrate provided with a nanostructure which has the position and the orientation designed more freely can be produced. For example, by appropriately controlling the affinity of the formed structure for the substrate, a phase-separated structure with a cylinder structure or lamellar structure oriented in a direction perpendicular to the surface of the substrate can be more reliably formed.

[Optional Step]

The method of forming a structure containing a phase-separated structure according to the second aspect of the present invention is not limited to the above embodiment, and may include a step (optional step) other than steps (i) and (ii).

Examples of the optional steps include a step of selectively removing a phase constituted of at least one block of the plurality of blocks constituting the block copolymer contained in the BCP layer 3 (hereafter, referred to as "step (iii)"), and a guide pattern formation step.

Step (iii)

In step (iii), from the BCP layer 3 formed on the brush layer 2, a phase constituted of at least one block of the plurality of blocks constituting the block copolymer (phase 3*a* and phase 3*b*) is selectively removed. In this manner, a fine pattern (polymeric nanostructure) can be formed.

Examples of the method of selectively removing a phase constituted of a block include a method in which an oxygen plasma treatment or a hydrogen plasma treatment is conducted on the BCP layer.

Hereafter, among the blocks constituting the block copolymer, a block which is not selectively removed is referred to as "block $P_A$", and a block to be selectively removed is referred to as "block $P_B$". For example, after the phase separation of a layer containing the block copolymer according to the present embodiment, by subjecting the layer to an oxygen plasma treatment or a hydrogen plasma treatment, the phase of the second block can be selectively removed. In such a case, the first block portion is the block PA, and the second block portion is the block PB.

Figure 2:
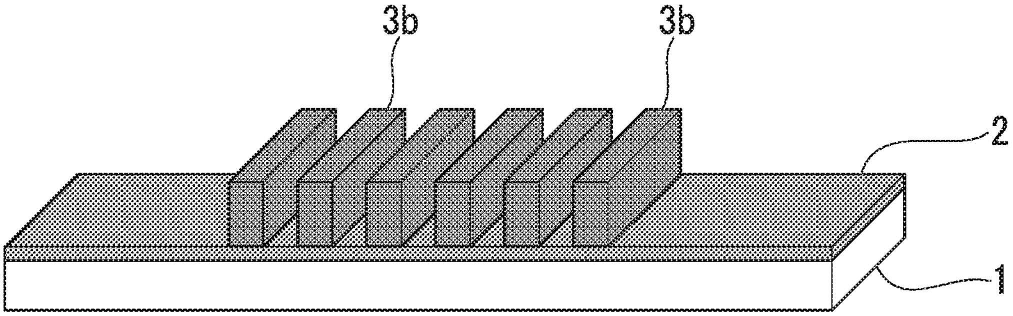
FIG. 2 is an explanatory diagram showing an example of one embodiment of an optional step.

FIG. 2 shows an example of one embodiment of step (iii).

In the embodiment shown in FIG. 2, by conducting oxygen plasma treatment on the structure 3' produced on the substrate 1 in step (ii), the phase 3*a* is selectively removed, and a pattern (polymeric nanostructure) constituted of phases 3*b* separated from each other is formed. In this case, the phase 3*b* is the phase constituted of the block $P_A$, and the phase 3*a* is the phase constituted of the block $P_B$.

The substrate 1 having a pattern formed by phase-separation of the BCP layer 3 as described above may be used as it is, or may be further heated to modify the shape of the pattern (polymeric nanostructure) on the substrate 1.

The heat treatment is preferably conducted at a temperature at least as high as the glass transition temperature of the block copolymer used and lower than the heat decomposition temperature. Further, the heating is preferably conducted in a low reactive gas such as nitrogen.

Guide Pattern Forming Step

In the method of forming a structure containing a phase-separated structure according to the second aspect of the present invention, a step of forming a guide pattern on the brush layer (guide pattern forming step) may be included. In this manner, it becomes possible to control the arrangement of the phase-separated structure.

For example, in the case of a block copolymer where a random fingerprint-patterned phase separation structure is formed without using a guide pattern, by providing a trench pattern of a resist film on the surface of the brush layer, a phase separation structure arranged along the trench can be obtained. The guide pattern can be provided on the brush layer 2 in accordance with the above-described principle. Further, when the surface of the guide pattern has affinity for any of the polymers constituting the block copolymer, a phase separation structure having a cylinder structure or lamellar structure arranged in the perpendicular direction of the surface of the substrate can be more reliably formed.

The guide pattern can be formed, for example, using a resist composition.

The resist composition for forming the guide pattern can be appropriately selected from resist compositions or a modified product thereof typically used for forming a resist pattern which have affinity for any of the polymers constituting the block copolymer. The resist composition may be either a positive resist composition capable of forming a positive pattern in which exposed portions of the resist film are dissolved and removed, or a negative resist pattern capable of forming a negative pattern in which unexposed portions of the resist film are dissolved and removed, but a negative resist composition is preferable. As the negative resist composition, for example, a resist composition containing an acid-generator component and a base component which exhibits decreased solubility in an organic solvent-containing developing solution under action of acid, wherein the base component contains a resin component having a structural unit which is decomposed by action of acid to exhibit increased polarity, is preferable.

When the resin composition is cast onto the brush layer having the guide pattern formed thereon, an anneal treatment is conducted to cause phase-separation. Therefore, the resist pattern for forming a guide pattern is preferably capable of forming a resist film which exhibits solvent resistance and heat resistance.

EXAMPLES

The present invention will be described more specifically with reference to the following examples, although the scope of the present invention is by no way limited by these examples.

Synthesis Example 1

Synthesis of 1,1,3,5,5-pentamethyl-1,5-divinyltrisiloxane

Under nitrogen flow, 3.33 ml of $H_2O$ (water), 27.2 ml of $NEt_3$ (triethylamine) and 800 ml of $Et_2O$ (diethylether) were placed in a reaction vessel, followed by cooling to 0° C. while stirring. A solution obtained by dissolving 25 ml of vinyldimethylchlorosilane in 25 ml of $Et_2O$ was dropwise added, followed by stirring for 15 minutes while maintaining the temperature at 0° C. Further, 22.8 ml of $NEt_3$ was added, and a solution obtained by dissolving 7.6 ml of dichloromethylsilane in 30 ml of $Et_2O$ was dropwise added, followed by stirring for 1 hour while maintaining the temperature at 0° C. The reaction solution was washed with hydrochloric acid, followed by purification by distillation under reduced pressure, thereby obtaining 12.2 g of 1,1,3,5,5-pentamethyl-1,5-divinyltrisiloxane (hereafter, referred to as "monomer (1)").

[Chemical Formula 12]

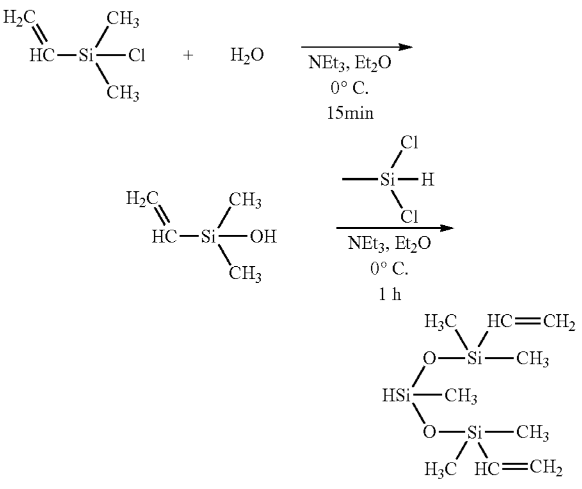

Monomer (1)

Synthesis Example 2

Synthesis of PS-b-PMVS 160 ml of THF was placed in a reaction vessel in an Ar atmosphere, followed by cooling to −78° C. A predetermined amount of SecBuLi (a hexane/cyclohexane mixed solution) and 2.21 ml of styrene were added, followed by stirring for 30 minutes while maintaining the temperature at −78° C. Then, 2.07 ml of trimethyltrivinylcyclotrisiloxane was added, and the temperature of the reaction liquid was changed to −20° C., followed by stirring for 24 hours. 1.33 ml of trimethylsilylchloride was added, and the reaction solution was poured into 700 ml of methanol, followed by collecting the precipitated solid by filtration. The collected solid was dried, so as to obtain 2.7 g of PS-b-PMVS (hereafter, referred to as "block copolymer (1)"). The obtained block copolymer (1) had Mn of 18,600, PDI of 1.10 (in terms of GPC), and styrene:methylvinylsiloxane (a:b)=58:42 (molar ratio) ($^1$H-NMR).

[Chemical Formula 13]

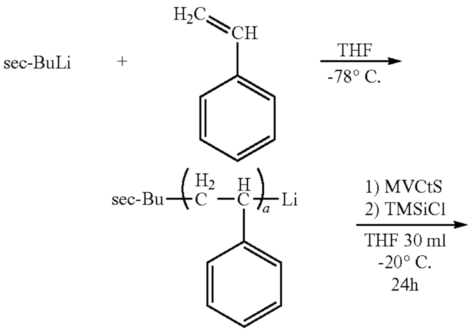

-continued

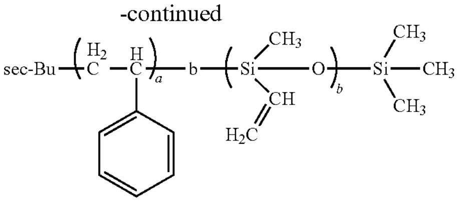

Block copolymer (1)

Example 1

Synthesis of PS-b-HBPMVS 1.0 g of block copolymer (1) and 5.00 ml of toluene were placed in a reaction vessel in an Ar atmosphere, followed by cooling to 0° C. A predetermined amount of a platinum catalyst (2% xylene solution) was added, and 3.24 g of monomer (1) was dropwise added, followed by stirring for 5 minutes. The temperature of the reaction liquid was changed to room temperature, followed by stirring for 3 hours. Then, the reaction solution was poured into 400 ml of methanol, followed by collecting the precipitated solid by filtration. The collected solid was dissolved in 5 ml of THF, and the resultant was poured into 400 ml of methanol, followed by collecting the precipitated solid by filtration. The same operation was repeated, so as to conduct reprecipitation 3 times in total. The collected solid was dried, so as to obtain 0.93 g of PS-b-HBPMVS (a block copolymer consisting of a block of styrene and a block of siloxane derivative A, represented by the following structural formula; hereafter, referred to as "block copolymer (2)"). The obtained block copolymer (2) had Mn of 20,700, PDI of 1.19 (in terms of GPC), and styrene:siloxane derivative A (a:b)=58:42 (mlar ratio) ($^1$H-NMR).

[Chemical Formula 14]

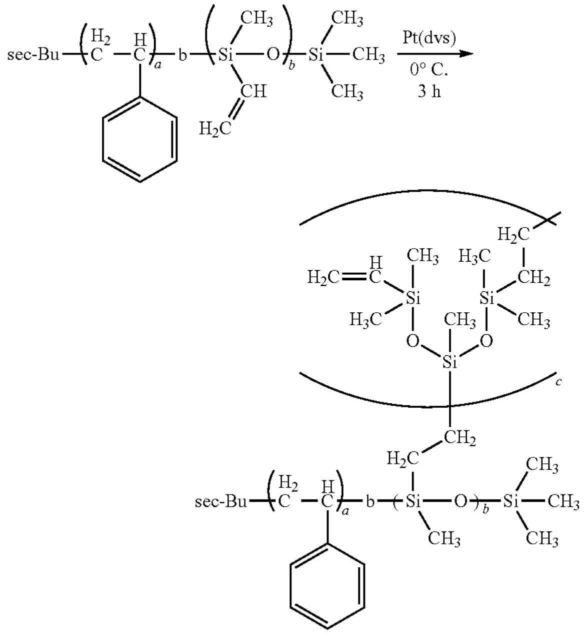

Block copolymer (2)

Example 2

Synthesis of PS-b-HBPMPrOHS 0.3 g of block copolymer (2), 0.025 g of azobisisobutyronitrile (AIBN), 1.3 ml of 3-mercapto-1-propanol and 1.5 ml of THF were placed in a reaction vessel, and the reaction vessel was purged with Ar, followed by freeze degassing 3 times. Stirring was conducted at 60° C. for 1 hour, followed by rapid cooling with an ice bath and liquid nitrogen. The reaction solution was poured into 300 ml of pure water, followed by collecting the precipitated solid by filtration. The collected solid was dried, so as to obtain 0.35 g of PS-b-HBPMPrOHS (a block copolymer consisting of a block of styrene and a block of siloxane derivative B, represented by the following structural formula; hereafter, referred to as "block copolymer (3)"). The obtained block copolymer (3) had Mn of 21,200, PDI of 1.20 (in terms of GPC), and styrene:siloxane derivative B (a:b)=58:42 (molar ratio) ($^1$H-NMR).

[Chemical Formula 15]

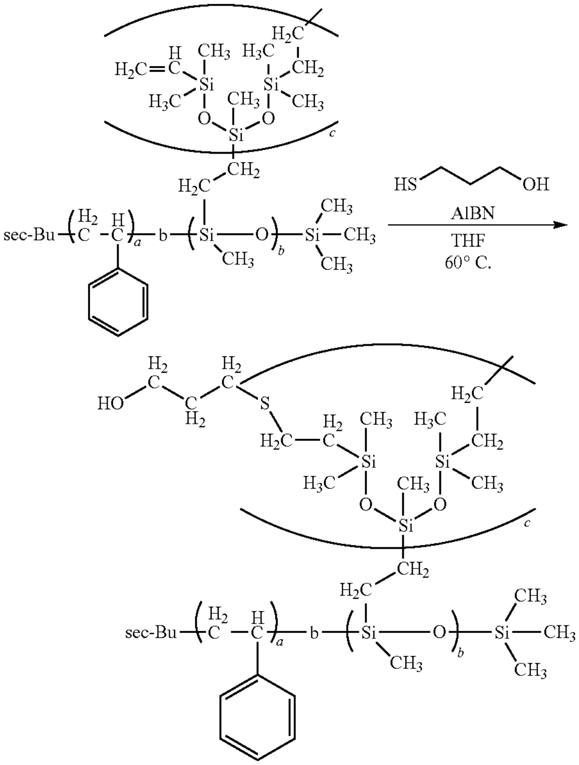

Block copolymer (3)

Example 3

Formation of Phase-Separated Structure

To an 8-inch silicon wafer, as a brush composition, a resin composition (a copolymer of methyl methacrylate/methacrylic acid=95/5 with Mw=43,400 and Mw/Mn=1.77) adjusted to a concentration of 1.0% by weight with PGMEA was applied using a spinner, followed by baking at 200° C. for 60 seconds and dried, so as to form a brush layer having a film thickness of 20 nm on the substrate.

Subsequently, portions of the brush layer other than that adhered to the substrate was removed by a solvent (PGMEA), and a solution of the block copolymer (4) (a block copolymer represented by the same structural formula as block copolymer (3); Mn: 16,200, PDI: 2.15 (in terms of GPC), styrene:siloxane derivative B (a:b)=54:46 (molar ratio) (1H-NMR)) (solvent; a mixed solvent of chloroform/methyl amyl ketone=3/1; 0.75 wt %) was spin-coated (number of rotation: 4,500 rpm, 60 seconds).

The coating film thickness of the layer containing the block copolymer (4) (hereafter, referred to as "layer of resin composition for forming phase-separated structure") was 20 nm.

The substrate having the resin composition for forming phase-separated structure coated thereon was heated under reduced pressure at 130° C. for 12 hours for annealing, so as to form a phase-separated structure.

Thereafter, a selective removal treatment of the block was conducted, so as to form a line and space pattern. The resolution (nm) of the formed pattern was evaluated by analyzing an SEM image. The results are shown in Table 1.

Example 4

Comparative Example 1

A phase-separated structure was formed in the same manner as in Example 3, except that block copolymer (5) (a block copolymer represented by the same structural formula as block copolymer (3); Mn: 19,000, PDI: 1.26 (in terms of GPC), styrene:siloxane derivative B (a:b)=62:38 (molar ratio) (1H-NMR)) or block copolymer (6) (PS-b-PMMA; Mn: 25,700, PDI: 1.11 (in terms of GPC), PS:PMMA=50:50 (molar ratoi) (1H-NMR)) was used instead of block copolymer (4).

Thereafter, a selective removal treatment of the block was conducted, so as to form a line and space pattern. The resolution of the formed pattern was evaluated in the same manner as in Example 3. The results are shown in Table 1.

TABLE 1

| | Block copolymer | Resolution (nm) |
|---|---|---|
| Example 3 | Block copolymer (4) | 16.2 |
| Example 4 | Block copolymer (5) | 21.0 |
| Comparative Example 1 | Block copolymer (6) | 22.0 |

As seen from the results shown in Table 1, it was confirmed that the block copolymers of Examples 3 and 4 which applied the present invention exhibited good resolution, as compared to the block copolymer of Comparative Example 1 which did not apply the present invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A block copolymer comprising a first block and a second block, the first block consisting of a polymer (P1) having a repeating structure of a structural unit (u1) containing in a side chain thereof a hyperbranched structure containing a silicon atom, wherein the polymer (P1) comprises a partial structure represented by general formula (P101) shown below and a partial structure represented by general formula (P102) shown below:

(P101)

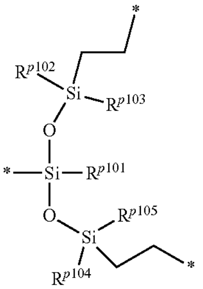

wherein $R^{P101}$ to $R^{P105}$ each independently represents a hydrogen atom, an alkyl group of 1 to 6 carbon atoms, an alkoxy group of 1 to 6 carbon atoms or a hydroxyalkyl group of 1 to 6 carbon atoms; and * represents a valence bond;

(P102)

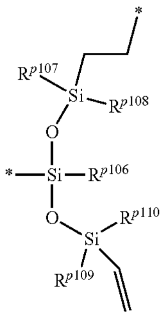

wherein $R^{P106}$ to $R^{P110}$ each independently represents a hydrogen atom, an alkyl group of 1 to 6 carbon atoms, an alkoxy group of 1 to 6 carbon atoms or a hydroxyalkyl group of 1 to 6 carbon atoms; and * represents a valence bond.

2. The block copolymer according to claim 1, wherein the hyperbranched structure containing a silicon atom has a polar group on the terminal thereof.

3. The block copolymer according to claim 1, wherein the structural unit (u1) is represented by general formula (u1-1) shown below:

(u1-1)

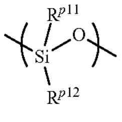

wherein $R^{P11}$ represents an organic group having a hyperbranched structure containing a silicon atom; $R^{P12}$ represents an alkyl group, a halogenated alkyl group, a hydrogen atom or an organic group having a hyperbranched structure containing a silicon atom.

4. The block copolymer according to claim 3, wherein the structural unit (u1) is represented by general formula (u1-1-1) shown below:

(u1-1-1)

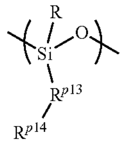

wherein R represents a hydrogen atom, an alkyl group of 1 to 5 carbon atoms or a halogenated alkyl group of 1 to 5 carbon atoms; $R^{P13}$ represents a divalent linking group; $R^{P14}$ represents an organic group having a hyperbranched structure containing a silicon atom, wherein at least a part of the terminal of the hyperbranched structure is a group containing a polar group.

5. The block copolymer according to claim 4, wherein the group containing a polar group in $R^{P14}$ in general formula (u1-1-1) is at least one member selected from the group consisting of groups represented by chemical formulae ($R^{P15}$-1-1) to ($R^{P15}$-1-9) shown below, chemical formulae ($R^{P15}$-2-1) to ($R^{P15}$-2-12) shown below and chemical formulae ($R^{P15}$-3-1) to ($R^{P15}$-3-8) shown below:

($R^{P15}$-1-1)

($R^{P15}$-1-2)

($R^{P15}$-1-3)

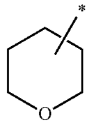

($R^{P15}$-1-4)

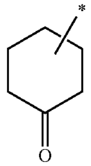

($R^{P15}$-1-5)

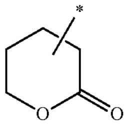

($R^{P15}$-1-6)

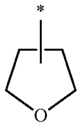

-continued
($R^{P15}$-1-7)
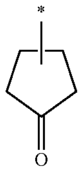
($R^{P15}$-1-8)
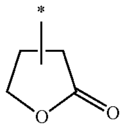
($R^{P15}$-1-9)
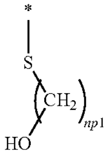
($R^{P15}$-2-1)
($R^{P15}$-2-2)
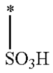
($R^{P15}$-2-3)
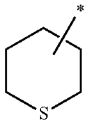
($R^{P15}$-2-4)
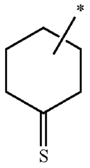
($R^{P15}$-2-5)
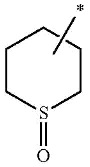
($R^{P15}$-2-6)
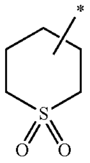
($R^{P15}$-2-7)
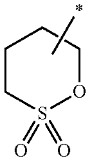
-continued
($R^{P15}$-2-8)
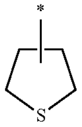
($R^{P15}$-2-9)
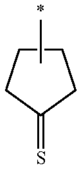
($R^{P15}$-2-10)
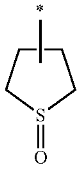
($R^{P15}$-2-11)
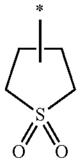
($R^{P15}$-2-12)
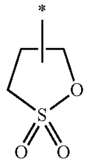
($R^{P15}$-3-1)
($R^{P15}$-3-2)
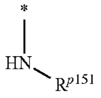
($R^{P15}$-3-3)
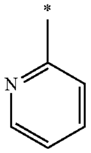
($R^{P15}$-3-4)
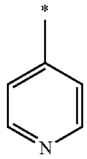
($R^{P15}$-3-5)
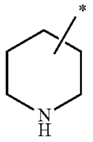

-continued ($R^{P15}$-3-6)

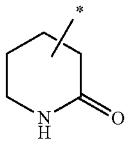

($R^{P15}$-3-7)

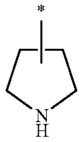

($R^{P15}$-3-8)

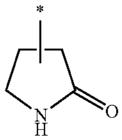

wherein $R^{P151}$ represents an arbitrary organic group; npl represents an integer of 1 to 10; and * represents a valence bond.

6. The block copolymer according to claim 1, wherein the second block consists of:

a polymer having a repeating structure of a structural unit derived from styrene;

a polymer having a repeating structure of a structural unit derived from an acrylate ester which may have the hydrogen atom bonded to the carbon atom on the a-position substituted with a substituent;

a polymer having a repeating structure of a structural unit derived from acrylic acid which may have the hydrogen atom bonded to the carbon atom on the a-position substituted with a substituent;

a polymer having a repeating structure of a structural unit derived from a siloxane; or a polymer having a repeating structure of a structural unit derived from an alkyleneoxide.

7. The block copolymer according to claim 1, which has a number average molecular weight of 5,000 to 2,000,000.

8. The block copolymer according to claim 1, wherein a weight ratio of the first block to the second block is 10:90 to 90:10.

9. A method of producing a structure containing a phase-separated structure, the method comprising:

forming a layer containing the block copolymer according to claim 1 on a substrate, and phase-separating the block copolymer.

10. The method according to claim 9, further comprising applying a brush composition to the substrate to form a brush layer, and forming a layer containing a block copolymer comprising a first block and a second block, the first block consisting of a polymer (P1) having a repeating structure of a structural unit (u1) containing in a side chain thereof a hyperbranched structure containing a silicon atom, on the brush layer.

11. The method according to claim 9, which comprises, prior to forming the layer containing the block copolymer, forming a guide pattern on the substrate.

12. A block copolymer comprising a first block and a second block, the first block consisting of a polymer (P1) having a repeating structure of a structural unit (u1) represented by general formula (u1-1-1) shown below:

(u 1-1-1)

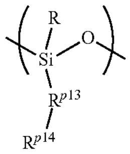

wherein R represents a hydrogen atom, an alkyl group of 1 to 5 carbon atoms or a halogenated alkyl group of 1 to 5 carbon atoms; $R^{P13}$ represents a divalent linking group; $R^{P14}$ represents an organic group having a hyperbranched structure containing a silicon atom, wherein at least a part of the terminal of the hyperbranched structure is a group represented by chemical formula ($R^{P15}$-1-2) to ($R^{P15}$-1-9)

shown below, chemical formulae ($R^{P15}$-2-1) to ($R^{R15}$-2-12) shown below and chemical formulae ($R^{P15}$-3-1) to ($R^{P15}$-3-8) shown below:

($R^{P15}$-1-2)

($R^{P15}$-1-3)

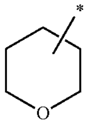

($R^{P15}$-1-4)

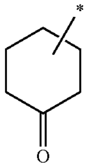

($R^{P15}$-1-5)

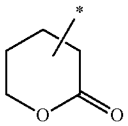

($R^{P15}$-1-6)

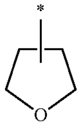

($R^{P15}$-1-7)

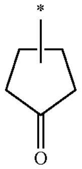

($R^{P15}$-1-8)

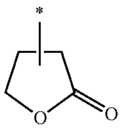

-continued
($R^{P15}$-1-9)
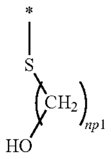
($R^{P15}$-2-1)
($R^{P15}$-2-2)
($R^{P15}$-2-3)
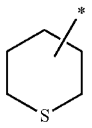
($R^{P15}$-2-4)
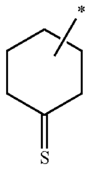
($R^{P15}$-2-5)
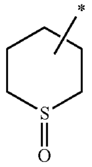
($R^{P15}$-2-6)
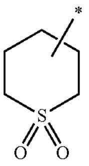
($R^{P15}$-2-7)
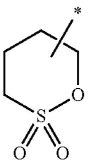
($R^{P15}$-2-8)
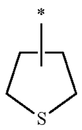
($R^{P15}$-2-9)
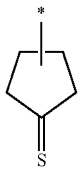
-continued
($R^{P15}$-2-10)
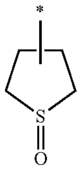
($R^{P15}$-2-11)
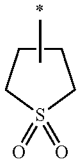
($R^{P15}$-2-12)
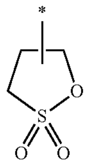
($R^{P15}$-3-1)
($R^{P15}$-3-2)
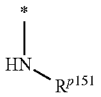
($R^{P15}$-3-3)
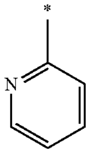
($R^{P15}$-3-4)
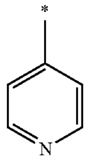
($R^{P15}$-3-5)
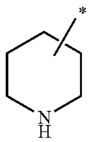
($R^{P15}$-3-6)
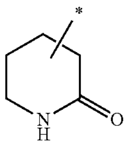
($R^{P15}$-3-7)
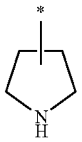

-continued
($R^{P15}$-3-8)
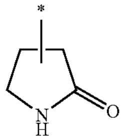
wherein $R^{151}$ represents an arbitrary organic group, np1 represents an integer of 1 to 10; and * represents a valence bond.
* * * * *

UNITED STATES PATENT AND TRADEMARK OFFICE

CERTIFICATE OF CORRECTION

PATENT NO. : 10,941,253 B2
APPLICATION NO. : 15/895588
DATED : March 9, 2021
INVENTOR(S) : Teruaki Hayakawa et al.

It is certified that error appears in the above-identified patent and that said Letters Patent is hereby corrected as shown below:

On the Title Page

Item [30], Line 1, delete “JP2017” and insert -- 2017 --.

In the Specification

Column 3, Line 9, delete “a-substituted” and insert -- α-substituted --.
Column 3, Line 33, delete “a-substituted” and insert -- α-substituted --.
Column 4, Line 2, delete “a-position” and insert -- α-position --.
Column 6, Line 49, delete “(4n+2) α” and insert -- (4n + 2) π --.
Column 8, Line 26, delete “substiuent,” and insert -- substituent, --.
Column 8, Line 46, delete “[—$(CH_2)_2)_{2}$-],” and insert -- [-$(CH_2)_2$-], --.
Column 8, Line 46, delete “[—$(CH_2)$3-],” and insert -- [-$(CH_2)_3$-], --.
Column 8, Line 47, delete “[—$(CH_2)_{4-}$]” and insert -- [-$(CH_2)_4$-] --.
Column 11, Line 29, delete “–C(=)–” and insert -- -C(=O)- --.
Column 11, Line 65, delete “($RP^{P15}$-2)” and insert -- ($R^{P15}$-2) --.
Column 11, Line 67, delete “($RP^{P15}$-3)” and insert -- ($R^{P15}$-3) --.
Column 12, Line 57, delete “apliphatic” and insert -- aliphatic --.
Column 13, Line 59, delete “ahalogen” and insert -- halogen --.
Column 13, Line 67, delete “npl” and insert -- np1 --.
Column 16, Line 27, delete “($R^{1315}$-3),” and insert -- ($R^{P15}$-3), --.
Column 19, Line 5, delete “pyrolidone,” and insert -- pyrrolidone, --.
Column 23, Line 15, delete “$R^{p11}$,” and insert -- $R^{p11'}$, --.
Column 30, Line 36, delete “(mlar ratio)” and insert -- (molar ratio) --.
Column 32, Line 38, delete “ratoi)” and insert -- ratio) --.

In the Claims

Column 37, Line 23, Claim 5, delete “npl” and insert -- np1 --.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*

Column 37, Line 34, Claim 6, delete “a-position” and insert -- α-position --.
Column 37, Line 37, Claim 6, delete “a- position” and insert -- α-position --.
Column 38, Line 20, Claim 12, delete “($R^{R15}$” and insert -- ($R^{P15}$ --.
Column 41, Line 10, Claim 12, delete “$R^{151}$” and insert -- $R^{P151}$ --.
Column 41, Line 10, Claim 12, delete “group” and insert -- group; --.